(12) United States Patent
Liu et al.

(10) Patent No.: US 10,038,703 B2
(45) Date of Patent: Jul. 31, 2018

(54) RATING NETWORK SECURITY POSTURE AND COMPARING NETWORK MALICIOUSNESS

(71) Applicant: THE REGENTS OF THE UNIVERSITY OF MICHIGAN, Ann Arbor, MI (US)

(72) Inventors: Mingyan Liu, Ann Arbor, MI (US); Michael Bailey, Champaign, IL (US); Manish Karir, Ann Arbor, MI (US); Yang Liu, Ann Arbor, MI (US); Jing Zhang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 270 days.

(21) Appl. No.: 14/801,016

(22) Filed: Jul. 16, 2015

(65) Prior Publication Data
US 2016/0021141 A1 Jan. 21, 2016

Related U.S. Application Data

(60) Provisional application No. 62/026,349, filed on Jul. 18, 2014.

(51) Int. Cl.
*H04L 29/06* (2006.01)
*H04L 29/12* (2006.01)

(52) U.S. Cl.
CPC ...... *H04L 63/1416* (2013.01); *H04L 63/1425* (2013.01); *H04L 63/1433* (2013.01); *H04L 63/1483* (2013.01); *H04L 61/2007* (2013.01)

(58) Field of Classification Search
CPC ............. H04L 63/1483; H04L 63/1416; H04L 63/1425; H04L 61/2007
See application file for complete search history.

(56) References Cited

U.S. PATENT DOCUMENTS

| | | |
|---|---|---|
| 5,797,134 A | 8/1998 | McMillan et al. |
| 2002/0021675 A1* | 2/2002 | Feldmann ............... H04L 45/00 370/254 |

(Continued)

OTHER PUBLICATIONS

Peter Boraros, "Network Anomaly Detection by Means of Spectral Analysis", Czech Technical University in Prague, p. 1-79.*

(Continued)

*Primary Examiner* — Samson Lemma
*Assistant Examiner* — Arya Golriz
(74) *Attorney, Agent, or Firm* — Marshall, Gerstein & Borun LLP

(57) ABSTRACT

Embodiments are disclosed for profiling network-level malicious activity. Profiling embodiments include observing malicious activity, representing such activity in accordance with a set of representative features, capturing temporal evolution of this malicious behavior and its dynamics, and using this temporal evolution to reveal key risk related properties of these networks. Embodiments are further disclosed addressing the connectedness of various networks and similarity in network-level maliciousness. Embodiments directed to similarity analyses include focusing on the notion of similarity—a quantitative measure of the extent to which the dynamic evolutions of malicious activities from two networks are alike, and mapping this behavioral similarity to their similarity in certain spatial features, which includes their relative proximity to each other and may be used to help predict the future maliciousness of a particular network. The embodiments described may be applicable to various network aggregation levels.

21 Claims, 16 Drawing Sheets
(13 of 16 Drawing Sheet(s) Filed in Color)

(56) References Cited

U.S. PATENT DOCUMENTS

| | | | | |
|---|---|---|---|---|
| 2007/0198874 | A1* | 8/2007 | Watanabe | G06F 11/0739 714/49 |
| 2008/0127338 | A1* | 5/2008 | Cho | G06F 21/566 726/22 |
| 2010/0019965 | A1* | 1/2010 | Xiao | G01S 19/07 342/357.48 |
| 2012/0096558 | A1* | 4/2012 | Evrard | G06F 21/577 726/25 |
| 2013/0097706 | A1* | 4/2013 | Titonis | G06F 21/56 726/24 |
| 2013/0166667 | A1* | 6/2013 | Carr | H04L 51/12 709/206 |
| 2013/0291107 | A1* | 10/2013 | Marck | G06F 21/316 726/23 |
| 2015/0013008 | A1* | 1/2015 | Lukacs | G06F 21/53 726/24 |

OTHER PUBLICATIONS

Borda, "Memoire sur les elections au scrutin," Histoire de l'Academie Royale des Sciences, Jun. 1770 (with English mechanical translation).

Bradner, "The internet standards process—revision 3", RFC 2026/BCP 9 (Oct. 1996).

Damas et al., Preventing use of recursive nameservers in reflector attacks, RFC 5358/BCP 140 (Oct. 2008).

Open Resolver Project—Results from 3 Months of Scans, downloaded from the Internet at <https://www.nanog.org/sites/default/files/tue.lightning3.open_resolver.mauch_.pdf> (2013).

Hubert et al., Measures for making dns more resilient against forged answers, RFC 5452 (Jan. 2009).

Barr et al., Common DNS operations and configuration errors, RFC 1912 (Feb. 1996).

Mahajan et al., Understanding BGP misconfiguration, Proc. of SIGCOMM '02, Pittsburgh, Pennsylvania (Aug. 19-23, 2002).

Ferguson et al., Network Ingress Filtering: Defeating Denial of Service Attacks which employ IP Source Address Spoofing, RFC 2827/BCP 38 (May 2000).

Durumeric et al., ZMap: fast internet-wide scanning and its security applications, Proc. 22nd USENIX Security Symposium (Aug. 2013).

Lindberg, Anti-spam recommendations for SMTP MTAs, BCP 30/RFC 2505 (Feb. 1999).

Klensin, Simple mail transfer protocol, RFC 5321 (Jul. 2008).

Zhang et al., On the mismanagement and maliciousness of networks, NDSS '14, San Diego, California (Feb. 23-26, 2014).

Zakir Durumeric, James Kasten, Michael Bailey, and J. Alex Halderman. Analysis of the HTTPS Certificate Ecosystem. In Proceedings of ACM IMC, pp. 291-304, Barcelona, Spain, Oct. 2013.

M. Patrick Collins, Timothy J. Shimeall, Sidney Faber, Jeff Janies, Rhiannon Weaver, Markus De Shon, and Joseph Kadane. Using Uncleanliness to Predict Future Botnet Addresses. In Pro-ceedings of ACM IMC, pp. 93-104, New York, NY, USA, Oct. 2007. ACM.

Amogh Dhamdhere and Constantine Dovrolis. Ten years in the evolution of the internet ecosystem. In Proceedings of ACM IMC, pp. 183-196, New York, NY, USA, Oct. 2008. ACM.

Nan Du, Bin Wu, Xin Pei, Bai Wang, and Liutong Xu. Community detection in large-scale social networks. In Proceedings of the 9th WebKDD and 1st SNA-KDD 2007, WebKDD/SNA-KDD '07, pp. 16-25, New York, NY, USA, Aug. 2007. ACM.

Zhiyun Qian, Zhuoqing Morley Mao, Yinglian Xie, and Fang Yu. On Network-level Clusters for Spam Detection. In NDSS, Feb. 2010.

Kuai Xu, Zhi-Li Zhang, and Supratik Bhattacharyya. Profiling Internet Backbone Traffic: Behavior Models and Applications. Proceedings of SIGCOMM, 35(4):169-180, Aug. 2005.

Zakir Durumeric, Eric Wustrow, and J. Alex Halderman. ZMap: Fast Internet-Wide Scanning and its Security Applications. In Proceedings of the 22nd USENIX Security Symposium, pp. 605-620, Washington, D.C., Aug. 2013.

G. Lindberg. Anti-Spam recommendations for SMTP MTAs. BCP 30/RFC 2505, Feb. 1999.

A. Hubert and R. Van Mook. Measures for Making DNS More Resilient against Forged Answers. RFC 5452, Jan. 2009.

K. Soska and N. Christin. Automatically Detecting Vulnerable Websites Before They Turn Malicious. In Proceedings of the 23rd USENIX Security Symposium, San Diego, CA, Aug. 2014.

Olivier Thonnard, Leyla Bilge, Anand Kashyap, and Martin Lee. Are You at Risk? Profiling Organi-zations and Individuals Subject to Targeted Attacks. In Financial Cryptography and Data Security, Jan. 2015.

Jing Zhang, Ari Chivukula, Michael Bailey, Manish Karir, and Mingyan Liu. Characterization of Blacklists and Tainted Network Traffic. In Proceedings of PAM, Hong Kong, Mar. 2013.

Jing Zhang, Zakir Durumeric, Michael Bailey, Manish Karir, and Mingyan Liu. On the Mismanage-ment and Maliciousness of Networks. In Proceedings of the Network and Distributed System Security Symposium (NDSS '14), San Diego, CA, Feb. 2014.

Andrew Y. Ng, Michael I. Jordan, and Yair Weiss. On Spectral Clustering: Analysis and an algorithm. In NIPS, pp. 849-856, Dec. 2001.

Christopher M Bishop et al. Pattern Recognition and Machine Learning, vol. 1. Springer New York. (2006).

Andrew Gelman, John B. Carlin, Hal S. Stern, and Donald B. Rubin. Bayesian Data Analysis, Second Edition. Chapman and Hall/CRC, 2 edition, Jul. 2003.

Brandon Oselio, Alex Kulesza, and Alfred Hero. Multi-layer graph analytics for dynamic social net-works. CoRR, Dec. 2013.

Liu et al.; "Cloudy with a Chance of Breach: Forecasting Cyber Security Incidents;" USENIX Symposium, Aug. 2015.

* cited by examiner

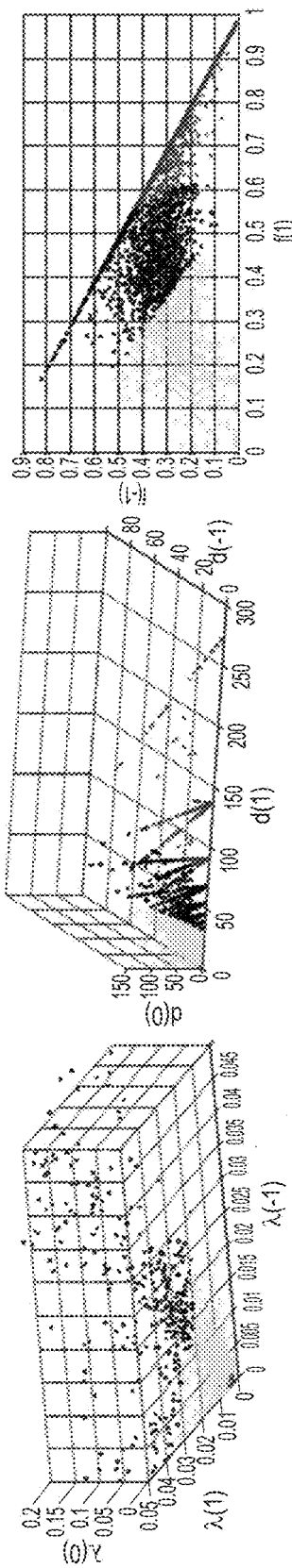
FIG. 5C Clustering over Frequency
FIG. 5B Clustering over Duration
FIG. 5A Clustering over Intensity

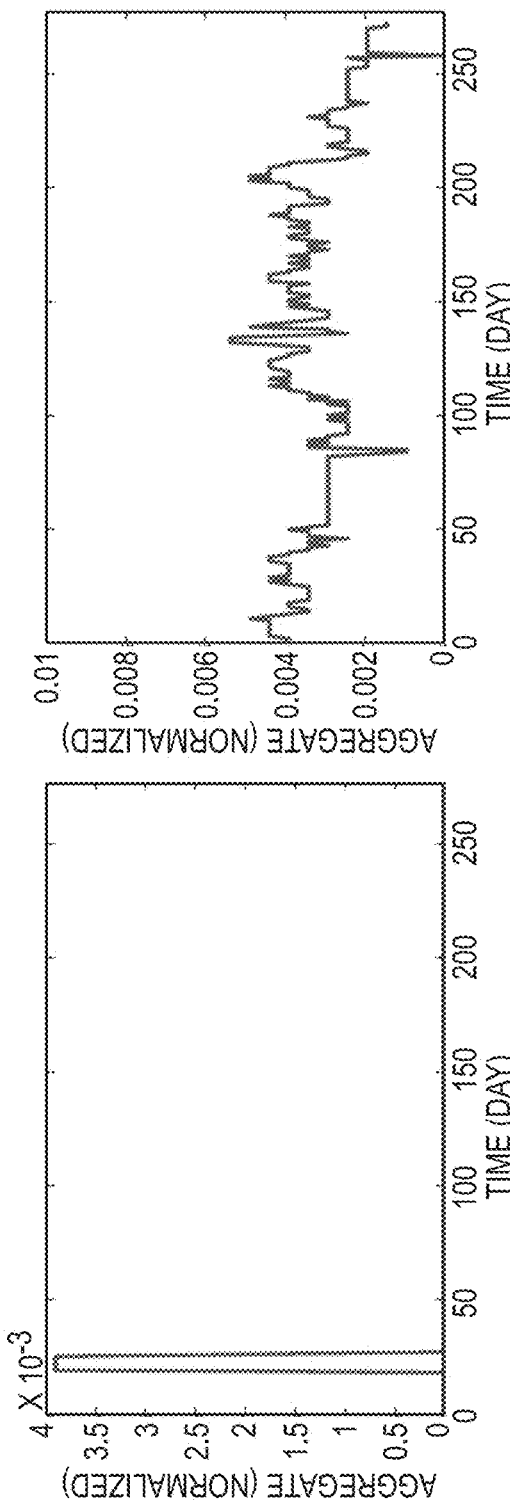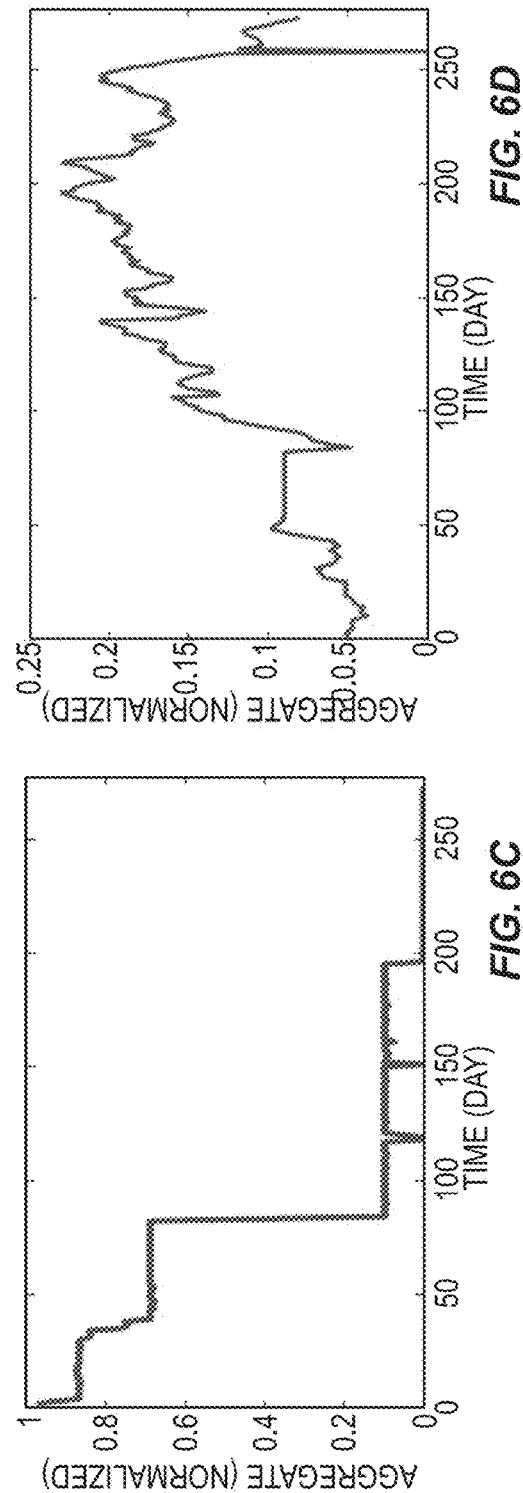

Scan: Country

Phishing: Type

Spam: AS

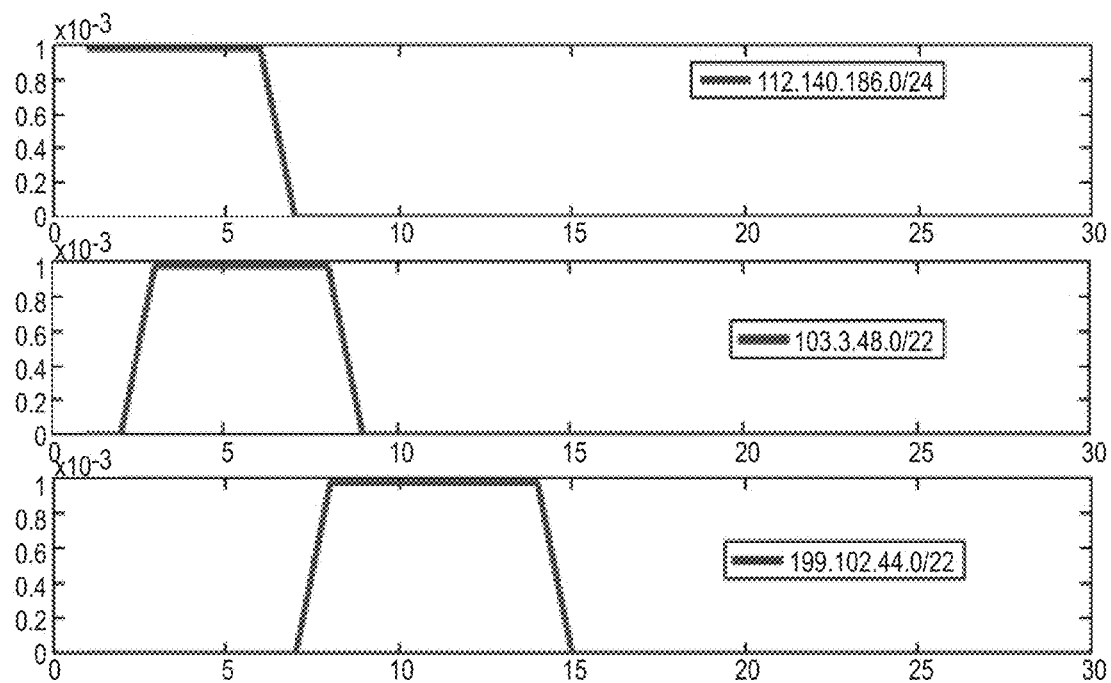
*FIG. 9A - Propagation Group 1*
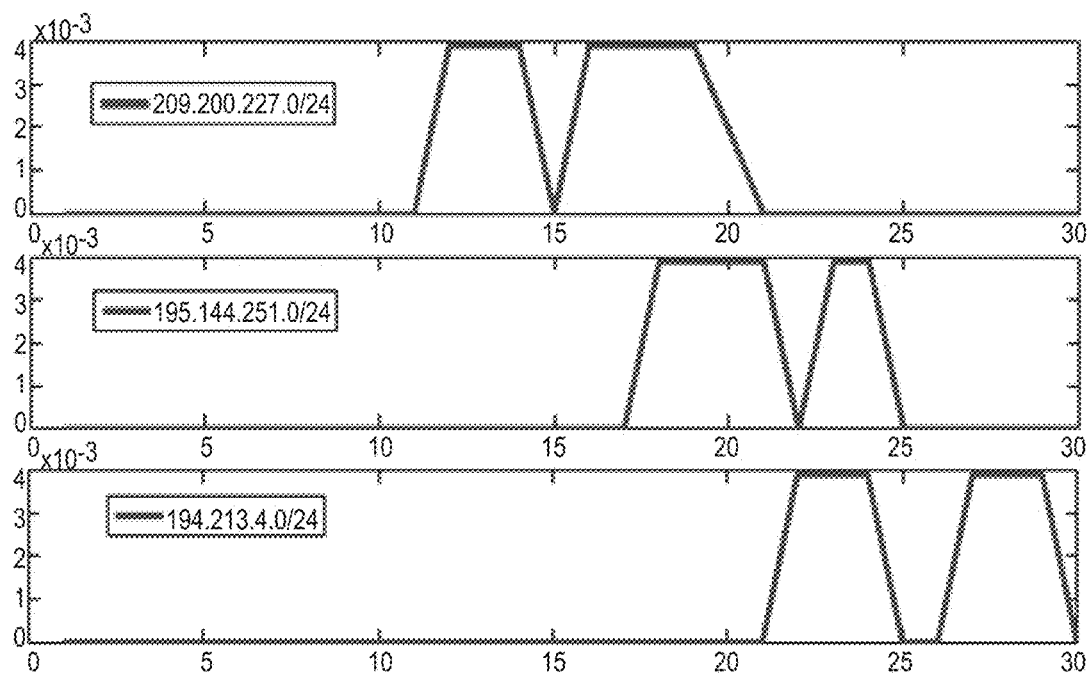
*FIG. 9B - Propagation Group 2*

RATING NETWORK SECURITY POSTURE AND COMPARING NETWORK MALICIOUSNESS

CROSS-REFERENCE TO RELATED APPLICATIONS

The priority benefit of U.S. Provisional Patent Application No. 62/026,349, entitled "Rating Network Maliciousness and Comparing Network Maliciousness through Similarity Analyses," filed on Jul. 18, 2014, is claimed and the disclosure of which is hereby incorporated by reference in its entirety.

STATEMENT OF GOVERNMENTAL INTEREST

This invention was made with government support under HSHQDC-13-C-B0015 awarded by the Department of Homeland Security/Science and Technology. The Government has certain rights in the invention.

FIELD OF THE INVENTION

The present disclosure relates to computer networks and, more particularly, to techniques for analyzing computer networks to determine susceptibility to malicious attacks and determining a similarity in malicious activity between different networks.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Networks are under constant security threats from various sources, including botnets, worms, spam, phishing and denial of service attacks. In response, network operators often adopt filtering and blocking policies at the application layer or the network layer that seek to minimize the impact of such threats. Filtering/blocking usually relies on host reputation systems or blacklists, which actively collect and distribute information about externally observed (malicious) activities associated with individual host internet protocol (IP) addresses. However, the highly dynamic nature of IP addresses limits the timeliness and accuracy of these largely reactive lists. Moreover, the large number of IP addresses on host reputation lists can significantly diminish their utility or lead to scalability issues.

SUMMARY

In accordance with an exemplary embodiment, a method for rating malicious network activity is described. The method may include (1) aggregating, by one or more processors, sets of internet protocol (IP) addresses from monitored network traffic over a sampling period; (2) measuring, by one or more processors, a number of malicious IP addresses within each of the aggregated sets of IP addresses over a plurality of time intervals within the sampling period; (3) generating, by one or more processors, a plurality of aggregate signals having a magnitude at each of the plurality of time intervals based on the number of malicious IP addresses within each of the plurality of time intervals; (4) categorizing, by one or more processors, each of the plurality of aggregate signals into one of a good, normal, or bad malicious value relative to an average magnitude of each respective aggregate signal over the corresponding sampling period; (5) assigning, by one or more processors, for each of the good, normal, and bad malicious values, one or more of an intensity, duration, and frequency feature to provide a feature set for each of the plurality of aggregate signals; (6) performing spectral analysis, by one or more processors, on each of the intensity, duration, and frequency feature set, respectively, for each of the plurality of aggregate signals; and (7) generating, by one or more processors, a plurality of maliciousness profiles based on the spectral analysis such that each of the respective intensity, duration, and frequency feature sets share dominant eigenvalues.

In accordance with another exemplary embodiment, a network analyzer for rating malicious network activity is described. The network analyzer may include a network interface configured to monitor network traffic and a processor configured to (1) aggregate sets of internet protocol (IP) addresses within the monitored network traffic over a sampling period; (2) measure a number of malicious IP addresses within each of the aggregated sets of IP addresses at a plurality of time intervals within the sampling period; (3) generate a plurality of aggregate signals having a magnitude at each of the plurality of time intervals based on the number of malicious IP addresses within each of the plurality of time intervals; (4) categorize each of the plurality of aggregate signals into one of a good, normal, or bad malicious value relative to an average magnitude of each respective aggregate signal over the corresponding sampling period; (5) generate a feature set for each of the plurality of aggregate signals by assigning, for each of the good, normal, and bad malicious values, one or more of an intensity, duration, and frequency feature; (6) perform a spectral analysis on each of the respective intensity, duration, and frequency feature set from each of the plurality of aggregate signals; and (7) generate a plurality of maliciousness profiles based on the spectral analysis such that each of the respective intensity, duration, and frequency feature set shares dominant eigenvalues.

In yet another exemplary embodiment, a method for comparing malicious network activity among networks is described. The method may include (1) monitoring, by one or more processors, malicious activity associated with malicious IP addresses from network traffic over a sampling period, the malicious internet protocol (IP) addresses being associated with one or more categories of malicious network behavior; (2) aggregating, by one or more processors, sets of IP addresses to provide a first and a second set of IP addresses; (3) generating, by one or more processors, a first and second aggregate signal from the first and the second set of IP addresses, respectively, the first and second aggregate signal each having a magnitude at each of a plurality of respective time intervals based on the number of malicious IP addresses within each of the plurality of time intervals, calculating, by one or more processors, a first and a second aggregate signal vector from the first and second aggregate signal, respectively; (4) calculating, by one or more processors, a temporal similarity matrix including temporal similarity matrix values, the temporal similarity matrix being based upon vector multiplication between a transpose of the first aggregate signal vector and the second aggregate signal vector such that the temporal similarity matrix values are indicative of a correlation between shapes of the first and second aggregate signals; and (5) determining, by one or more processors, a mathematical similarity of malicious network behavior between networks including IP addresses within the first and second aggregate group, respectively, based on the temporal similarity matrix values.

In each of the preceding exemplary embodiments, a higher number of malicious IP addresses may be associated with aggregate signals having a higher magnitude, and the malicious IP addresses may be associated with one or more categories of malicious network behavior, such as spam attacks, phishing attacks, malware attacks, active attacks, etc.

The figures described below depict various aspects of the system and methods disclosed herein. It should be understood that each figure depicts an embodiment of a particular aspect of the disclosed system and methods, and that each of the Figures is intended to accord with a possible embodiment thereof. Further, wherever possible, the following description refers to the reference numerals included in the following figures, in which features depicted in multiple figures are designated with consistent reference numerals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 5A-C illustrate example graphical plots of the results of clustering over various features (intensity, duration, and frequency, respectively), in accordance with an embodiment;

FIGS. 6A-6D illustrate example graphical plots of various aggregate signal profiles indicating certain malicious activities, in accordance with an embodiment;

FIGS. 9A and 9B illustrate example graphical plots for the aggregate signals corresponding to selected prefixes corresponding to phishing activity, in accordance with an embodiment;

DETAILED DESCRIPTION

Figure 1:
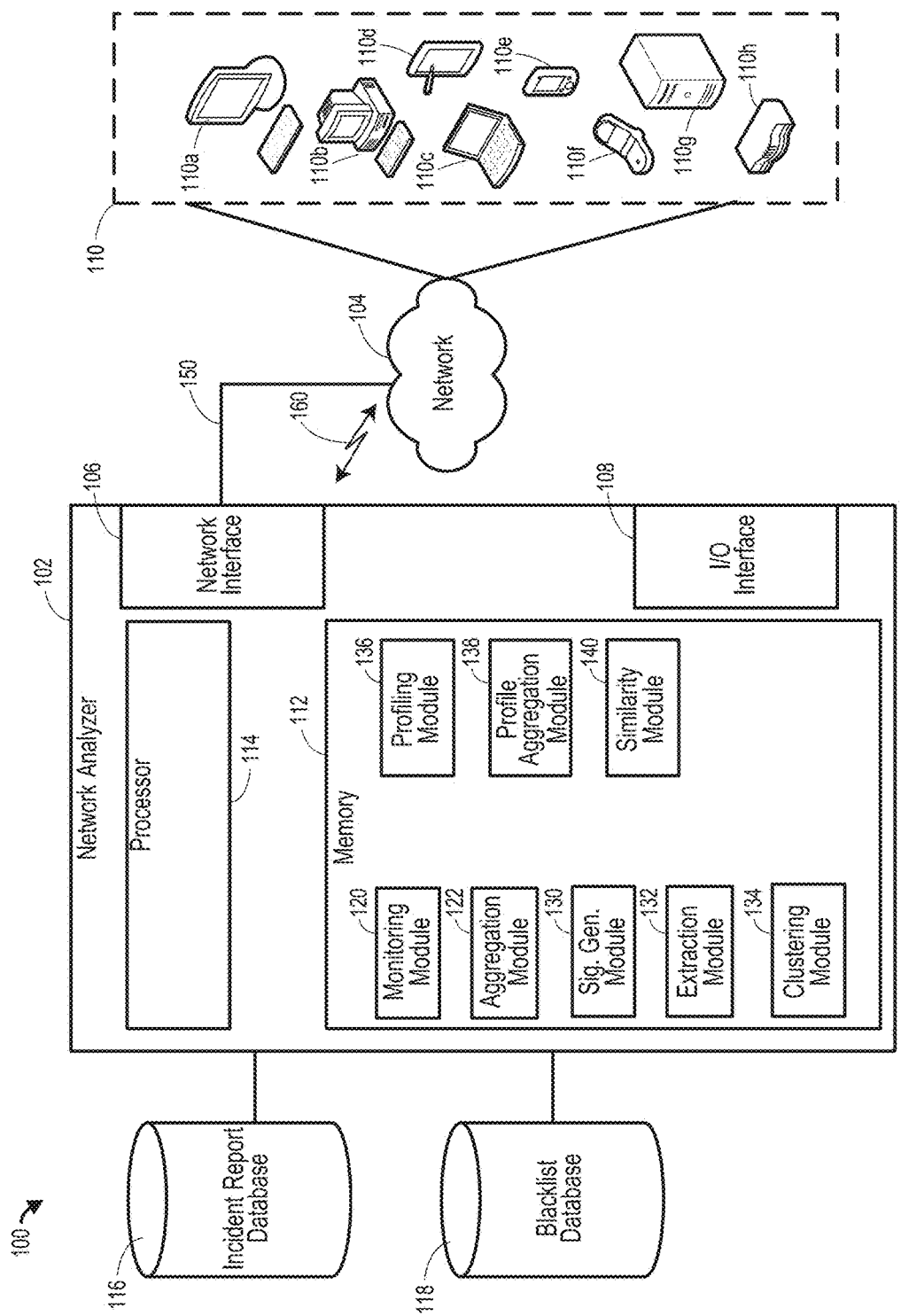
FIG. 1 illustrates an example network analysis system 100 in accordance with an embodiment of the disclosure.

One may expect a network (a set of IP addresses suitably defined, e.g., according to Autonomous System (AS), or routing prefix, or other administrative domain) to exhibit more stable and thus more predictive behavior, over time. This level of analysis, it has been found, provides a more robust and complete analysis of network susceptibility to malicious attack, when combined with the methods and determinations described herein. Furthermore, since the BGP prefix is the smallest network aggregate that is globally visible, this provides a level of resolution finer than those others mentioned above while being large enough to exhibit common aggregate traits.

Factors influencing a network's security posture and the resulting malicious activity originated by that network generally vary on a slower time scale. These factors include various network policy related issues such as operating systems and patch levels, firewall policies, password strength checks, the expertise and training of IT personnel, and even user awareness levels. In turn, the potentially more stable and predictable behavior on the network level can allow risk aware policies to be more consistently and proactively applied. For instance, this information could be used to determine which subset of the total network traffic should be directed through an expensive deep packet inspection device, or instances where additional authentication might be requested from users, or where filtering traffic could help reduce the risk projected by that network. Such risk profiles of prefixes could factor into the formulation of cyber insurance policies.

The present application is divided into two sections. The first section focuses on network-level malicious activity profiling. More specifically, the first section focuses on (1) when examined at a network level, observing malicious activity and representing such activity in accordance with a set of representative features, and (2) capturing temporal evolution of this malicious behavior and its dynamics and using this temporal evolution to reveal key risk related properties of these networks.

The second section focuses on connectedness of various networks and similarity in network-level maliciousness. More specifically, the second section focuses on (1) the notion of similarity, a quantitative measure of the extent to which the dynamic evolutions of malicious activities from two networks are alike, and (2) mapping this behavioral similarity to their similarity in certain spatial features, including their relative proximity to each other. Using the measured similarity, the second section further discusses how the similarity may be used to help predict the future maliciousness of a particular network.

The techniques herein may be used at other network aggregation levels, for example, at the AS level, a collection of connected IP routing prefixes under the control of one or more network operators, enterprise network level which would include a series of prefixes, or arbitrarily-defined network levels. In contrast to looking at the link level or host level, analyzing traffic at the network level allows for better aggregation of data analytics and better overall assessment of network security, especially for large networks that may contain many different hosts only a few of which are susceptible to (or the intended object of) malicious attack.

Furthermore, although several examples are discussed with regards to grouping sets of IP addresses by their common network prefixes, those of ordinary skill in the relevant art(s) will appreciate that any suitable grouping of IP addresses may be performed depending on the desired level of relevant network analysis. For example, IP addresses may be grouped by AS type, country of origin, etc., to determine an overall network maliciousness for a respective network level entity.

I. Network-Level Malicious Activity Profiling

FIG. 1 illustrates an exemplary network analysis system 100 in accordance with an exemplary embodiment of the disclosure. Network analysis system 100 includes a network analyzer 102, a network 104, an incident report database 116, and a blacklist database 118. Network analyzer 102 may include a network interface 106, an I/O interface 108, a memory 112, and a processor 114.

Each of network interface 106, I/O interface 108, memory 112, processor 114, incident report database 116, blacklist database 118, and/or network 104 may be configured to communicate with one another and/or to transfer data between one another. For example, each of network interface 106, I/O interface 108, memory 112, processor 114, incident report database 116, blacklist database 118, and/or network 104 may be coupled via any suitable number and/or type of wired and/or wireless links (e.g., wired link 150 and/or wireless link 160), buses, etc., which may function as address/data buses, for example. Wired and/or wireless communications, which may take place between any combination of network interface 106, I/O interface 108, memory 112, processor 114, incident report database 116, blacklist database 118, and/or network 104, may be facilitated via any suitable number and type of communication protocols. The interconnections between the components of network analyzer 102 are not shown in FIG. 1 for purposes of brevity.

Network analyzer 102 may be configured to monitor and/or analyze network traffic traversing one or more networks 104 (only one shown for purposes of brevity). By way of example, network 104 may include any number of addressable host devices 110, which may include, for example, desktop computers 110a, 110b, laptop computers 110c, personal data assistants, 110d, 110e, cellular phones 110f, networks servers 110g, routers 110h, and/or other suitable devices. Network analyzer 102 may be configured to interface with the network monitoring network level traffic and data via network interface 106.

I/O interface 108 may be configured to facilitate interaction between network analyzer 102 and a user. For example, I/O interface 108 may include any suitable number of external input and/or output devices, such as monitors, keyboards, touch pads, etc. In an embodiment, I/O interface 108 may be configured to facilitate communications with one or more portions of network analyzer 102 via one or more suitable connections, which are not shown in FIG. 1 for purposes of brevity.

Processor 114 may be configured to communicate and/or operate in conjunction with one or more of network interface 106, I/O interface 108, memory 112, processor 114, incident report database 116, blacklist database 118, and/or network 104 to facilitate one or more functions of the embodiments as described herein.

Processor 114 may be implemented as any suitable type and/or number of processors, such as a host processor of network analyzer 102, for example. To provide additional examples, processor 114 may be implemented as an application specific integrated circuit (ASIC), an embedded processor, a central processing unit associated within network analyzer 102, etc.

Processor 114 may be configured to execute instructions stored in memory 112, to store data to incident report database 116, blacklist database 118, and/or memory 112, and/or to retrieve data from incident report database 116, blacklist database 118, and/or memory 112. In accordance with various embodiments, memory 112 may be a computer-readable non-transitory storage device that may include any suitable combination of volatile (e.g., a random access memory (RAM), or non-volatile memory (e.g., battery-backed RAM, FLASH, etc.).

Memory 112 may be configured to store instructions executable on processor 114, such as the various memory modules illustrated in FIG. 1, which are further discussed below. These instructions may include machine readable instructions that, when executed by processor 114, cause processor 114 to perform various acts as described herein. Memory 112 may also be configured to store any other suitable data, such as logs of similarity analyses, prediction data, maliciousness profiles, etc.

Although the various modules are illustrated in FIG. 1 as being included as part of memory 112, those of ordinary skill in the relevant art(s) will appreciate that any number of modules as shown in FIG. 1 may be stored in memory 112, processor 114, and/or any other suitable location (or combination of locations) accessible and executable by network analyzer 102.

As shown in the example of FIG. 1, memory 112 includes several modules including monitoring module 120, aggregation module 122, signal generation module 130, extraction module 132, clustering module 134, profiling module 136, profile aggregation module 138, and similarity module 140. Embodiments include processor 114 executing instructions stored in one or more of these modules to facilitate the corresponding functions addressed by that particular module, as further discussed in detail below. Network analyzer 102 may be configured to monitor network traffic via network interface 106 and processor 114 to determine a reputation blacklist (RBL). This may be performed by processor 114 executing instructions stored on monitoring module 120, for example. For example, an RBL may be constructed by identifying malicious IP addresses in the monitored network traffic that are stored in incident report database 116 and/or blacklist database 118.

In an embodiment, the RBL may be generated from IP addresses accessed via blacklist database 118 and verified using IP addresses accessed from incident report database 118 to better ensure that the RBL contains malicious IP addresses. Processor 114 may be configured to identify the malicious IP addresses at any suitable sampling interval over any suitable period of time. For example, network analyzer 102 may sample the monitored network data once per day over a period of several months and store the RBL data in memory 112, for example. Using such an example, the RBL data list content may be refreshed on a daily basis.

Table 1 illustrates an exemplary summary of RBL data and the type of malicious activities each list targets. As shown in TABLE 1, the RBL types may be grouped into three major categories of malicious behaviors: spam, phishing/malware, and active attacks/scanning. Based on the overall period of time in which a network (e.g., network 104) is monitored, the RBL dataset may include a large number of unique IP addresses. For example, sampling the monitored network data once per day over a nine month period may generate typical numbers of 164 million unique IP addresses.

TABLE 1

| Type | Blacklist Name |
| --- | --- |
| Spam | CBL [2], SBL [11], SpamCop [9], WPBL [14], UCEPOTECT [12] |
| Phishing/Malware | SURBL [10], Phish Tank [8], hpHosts [6] |
| Active attack | Darknet scanner list, Dshield [3], OpenBL [7] |

In an embodiment, the network traffic may be monitored to determine the dynamics of malicious activities on a network/organizational level. In accordance with such an embodiment, individual IP addresses listed in the RBL may be aggregated at a certain level. For example, the IP Addresses may be grouped, or aggregated, according to those having common network prefixes. In other words, processor 114 may count the number of IP addresses listed within a given sampling period (e.g., a day) that belong to the same prefix. This aggregation may be done over a single blacklist or over any suitable combination of multiple blacklists. This aggregation may be performed, for example, as a result of processor 114 executing instructions stored on aggregation module 122.

RBL Data Aggregation

In an embodiment, processor 114 may combine lists within each type of the malicious activities, resulting in a set of lists, or raw lists. More specifically, these lists may be referred to as a spam list, a scan list and a phishing list, respectively. In an embodiment, processor 114 may execute instructions stored in aggregation module 122 to list an IP address on a particular list on a given day if it shows up on at least one of the individual blacklists of that type. Throughout the present disclosure, the term union list may be used, which refers to a combination of lists (e.g., each list shown in TABLE 1) in the same fashion as mentioned above, to highlight the methodology which is not specific to any type.

In an embodiment, processor 114 may execute instructions stored in signal generator module 130 to aggregate IP addresses within a particular raw list to generate a discrete-time aggregate signal based on the IP address grouping. For example, if the IP addresses within a particular raw list are aggregated at the prefix level (i.e., according to those IP addresses having common prefixes), then for each prefix i an aggregate signal may be generated denoted by $r_i(t)$, $t=0, 1, 2, \ldots$.

In accordance with various embodiments, signal generation module 130 may include instructions to facilitate the generation of two types of aggregate signals by processor 114: a normalized version and an un-normalized version. Continuing the example of aggregation according to prefixes and using a sampling period of once per day, normalized aggregate signals, $r_i(t)$ may be generated by the fraction of the total number of IPs on the list and belonging to prefix i on day t, over the total number of addresses within prefix i. For the un-normalized aggregate signals $r_i(t)$, the aggregate signals are simply defined as the total number of IPs on the list and belonging to prefix i on day t. Using these definitions, a large aggregate value or magnitude is "bad," indicating a prefix with more of its IPs associated with malicious activities, and a small magnitude is "good." Also note that either definition produces a discrete-valued signal, as there are only a finite number of IP addresses in a prefix. Throughout this disclosure both the normalized and un-normalized aggregate signals will be simply referred to as aggregates or aggregate signals.

However, a complication can be introduced by the use of unequal prefix sizes. As a result, at least in some examples, when prefixes of different sizes are examined, the normalized aggregate definition is used, which hides the actual number of malicious IPs. Note that the actual number of malicious IPs (or more precisely the amount of malicious traffic sent from these IPs) has more to do with the impact a prefix has on the outside world, whereas the percentage aims at describing the health of a prefix itself.

For purposes of brevity, to describe various embodiments throughout the disclosure it is assumed, when relevant, that prefixes are of the same size, while development of profiles and their implications, when relevant, includes prefixes of all sizes. In various embodiments, aggregate signals may be generated based on the type of malicious activity they represent with reference to the categorizations shown in Table 1. The differences across these types of aggregate signals are further discussed below.

Although network analysis system 100 is illustrated in FIG. 1 as including a single network 104, a single incident report database 116, and a single blacklist database 118, embodiments include network analysis system 100 facilitating one or more of portions of the embodiments described throughout this disclose implementing any suitable number of networks, databases, and/or network analyzers working in conjunction with one another.

For example, network analysis system 100 may include any suitable number of network servers 110g configured to communicate with any suitable number of network analyzers 102 using any suitable number of networks 104. The embodiments described throughout this disclosure may incorporate one or more network analyzers 102 performing similarity analyses, rating network maliciousness, comparing malicious network activity among networks, etc., via communications between one another (e.g., via one or more networks) and/or via communications with one or more network servers 110g. These communications, and the various functions performed by each network analyzer, may occur, for example, in real-time (or near real-time).

Embodiments described throughout this disclosure may be performed in an automatic or semi-automatic fashion via network analysis system 100, requiring no user intervention or minimal user intervention, respectively. For example, processor 114 may be configured to monitor malicious network activity, aggregate sets of IP addresses, measure a number of malicious IP addresses, generate aggregate signals, categorize aggregate signals, provide feature sets, perform spectral analysis on feature sets, generate maliciousness profiles, calculate aggregate signal vectors, calculate temporal similarity matrices, etc., in accordance with a predetermined schedule, in response to the passage of a threshold period of time, as a result of a threshold number of malicious IP addresses being identified and/or stored, and/or based upon any other suitable trigger to eliminate or minimize user interaction with network analysis system 100.

Dynamics in Aggregate Behavior

Figure 2:
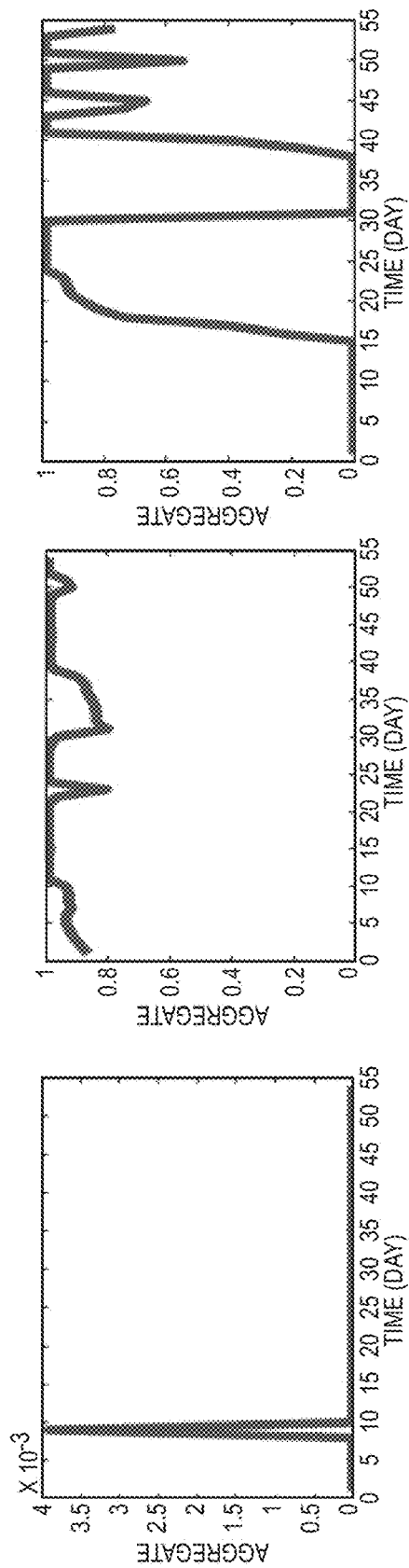
FIGS. 2A-2C illustrate example graphical plots of various aggregate signals, in accordance with an embodiment.

FIGS. 2A-2C illustrate example graphical plots of various aggregate signals, in accordance with an embodiment. The aggregate signal for the prefix grouping shown in FIG. 2A illustrates a network with consistently low levels of observed (normalized) malicious activities, while the aggregate signals for additional prefix groupings shown in FIGS. 2B and 2C show much higher levels of activity in general.

The aggregate signals shown in FIGS. 2B and 2C, however, differ in how persistent they are at their respective high levels. The aggregate signal shown in FIG. 2B exhibits a network that has over 80% of its IPs listed throughout this period (about 54 days), while the aggregate signal shown in FIG. 2C exhibits a network that fluctuates much more wildly, going as high as 100% (and quite frequently), and as low as 0%. As a result, it is advantageous to utilize more refined features to represent these differences. As further discussed below, a feature based approach may be implemented to capture such differences.

Feature-Based Profiling

Figure 3:
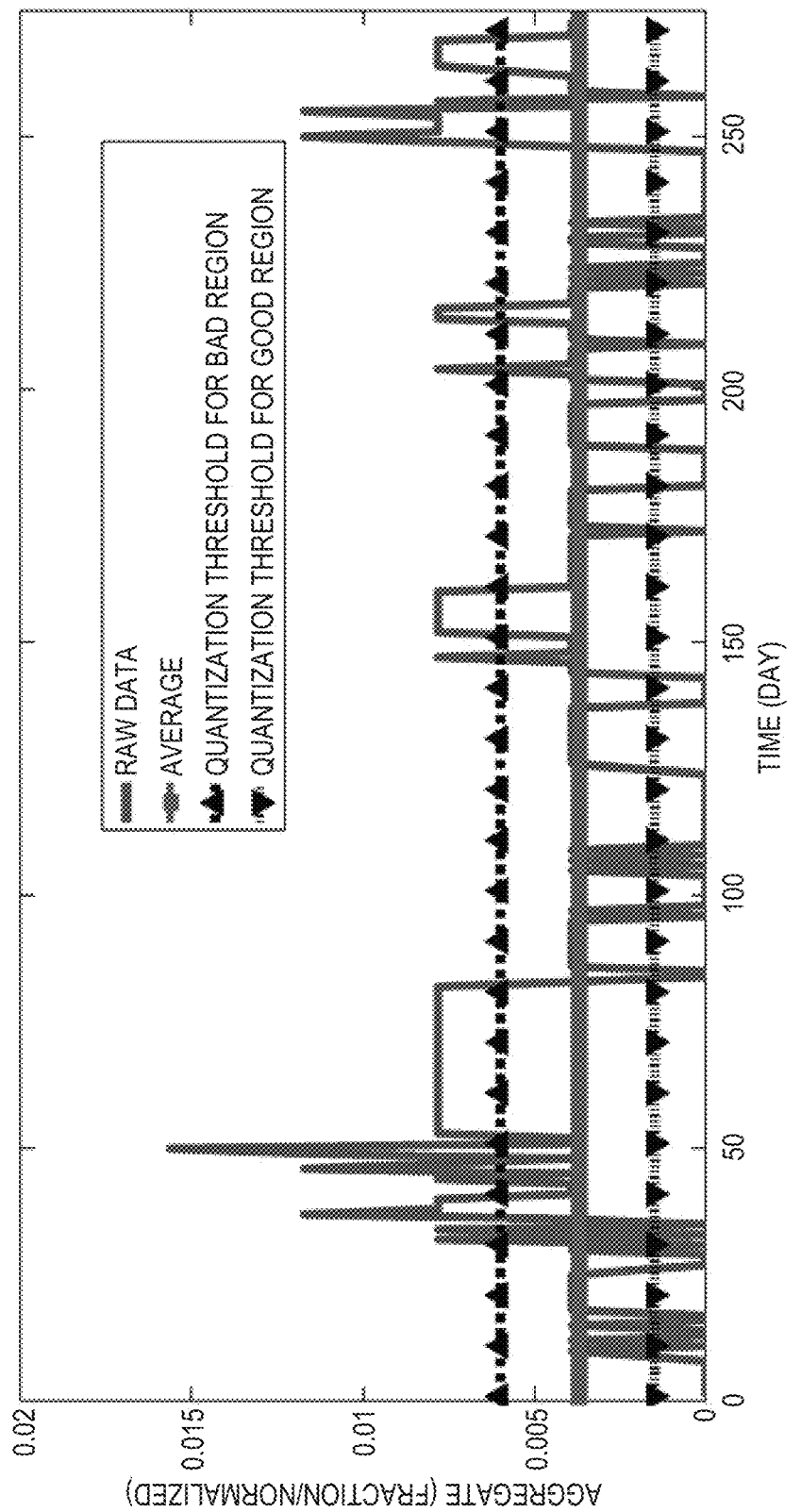
FIG. 3 illustrates an example graphical plot of value quantization on an aggregate signal, indicating different quantized regions based on signal trends, in accordance with an embodiment.

FIG. 3 illustrates an example graphical plot of value quantization on an aggregate signal, indicating different quantized regions based on signal trends, in accordance with an embodiment. The examples shown in FIG. 3 illustrate that it is advantageous to look beyond the average magnitude of these signals, as is typically done, and to instead examine higher order statistics to understand and describe the dynamic nature of the aggregate behavior. Toward this end, embodiments include defining several key features aimed at succinctly describing time series data and determining different time series data may be grouped, or clustered, along these features.

Feature Extraction

In an embodiment, an aggregate signal (e.g., one of IP addresses grouped by the same prefix) is first value-quantized into three regions: "good," "normal," and "bad," on a scale relative to that prefix's average magnitude. Specifically, the average magnitude of the aggregate signal is given by Eqn. 1.1 below. For simplicity, in Eqn. 1.1 the subscript i has been suppressed with the understanding that Eqn. 1.1 applies to any prefix i.

$$r_{ave} = \frac{\sum_{t=1}^{T} r(t)}{T} \quad \text{Eqn. 1.1}$$

In Eqn. 1.1, T represents a time horizon under consideration. A point at any given time t belongs to the "normal" region if $r(t) \in [(1-\delta)r_{ave}, (1+\delta)r_{ave}]$, the "good" region if $r(t) < [(1-\delta)r_{ave}]$, and the "bad" region if $r(t) < [(1+\delta)r_{ave}]$, where $0 < \delta < 1$ is a constant. As will be appreciated by those of ordinary skill in the relevant art(s), the determination of a suitable constant $\delta$ may be done based on a particular network's behavior. For example, the constant value may be determined through experimentation. The following example used throughout this disclosure uses a value of 0.2 for $\delta$.

An example of this quantization is shown in FIG. 3. This quantization of states is motivated by the observation that there are frequent phase transitions in the aggregate signals, which likely correspond to certain events, e.g., transitioning into a good phase may correspond to some IP addresses being removed from the blacklists following cleanup efforts.

In accordance with an embodiment, processor 114 may execute instructions stored in extraction module 132 to associate each region of the quantized aggregate signals with three features: intensity, duration, and frequency. Intensity may be described as the average magnitude of the aggregate signal within that region. Duration may be described as the average amount of time the signal remains in that region upon each entry (measured in terms of a nominal sampling period, such as days, for example). Frequency may be described as the rate (measured in number of times per nominal sampling period, such as days, for example, a fraction since our sampling rate example is once per day) at which the aggregate signal enters that region. As there are three regions, each feature is a triple, formally given as follows, with the indices 0, 1, and −1 denoting the normal, good and bad regions, respectively.

Intensity $\lambda = [\lambda(0), \lambda(1), \lambda(-1)]$

Duration $d = [d(0), d(1), d(-1)]$

Frequency $f = [f(0), f(1), f(-1)]$

Collectively, $[\lambda, d, f]$ form the feature vector set, or a feature matrix, that is further used by processor 114 to capture the dynamic behavior in the respective aggregate signal, as further exampled below.

Figure 4:
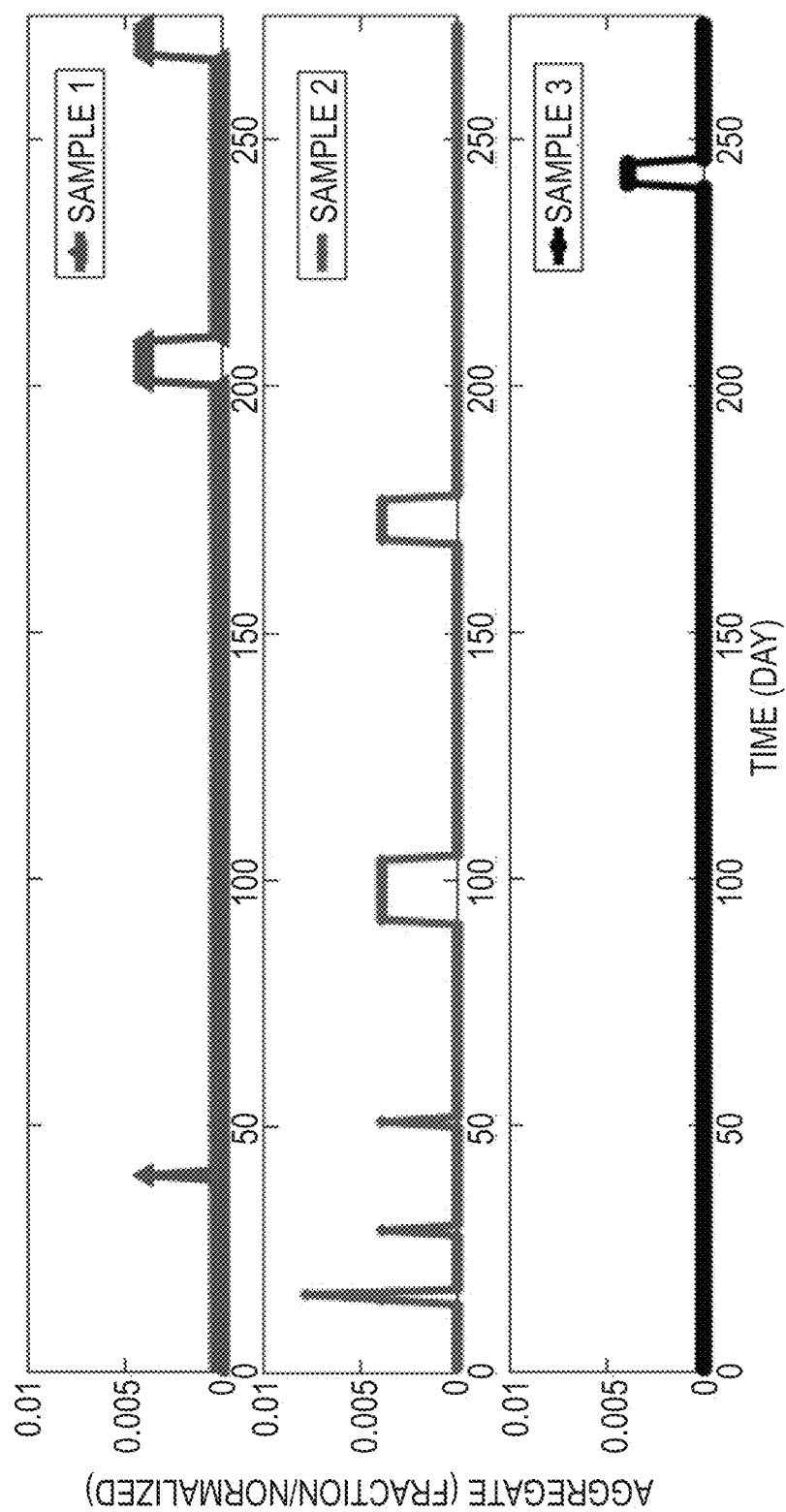
FIG. 4 illustrates an example graphical plot of three aggregate signal samples corresponding to three prefixes/samples, in accordance with an embodiment.

FIG. 4 illustrates an example graphical plot of three aggregate signal samples corresponding to three prefixes/samples, in accordance with an embodiment. In an embodiment, given a set of time signals $r_i(t)$ for a particular aggregated group i of IP addresses (e.g., those having a common prefix), $i \in \mathcal{P}$ where $\mathcal{P}$ is the space of group aggregation (e.g., the space of prefixes), clustering may be performed directly over these signals. A typical problem with a simple direct classification is that direct correlation between time signals may not reflect common properties, often due to time shift in those properties.

As shown in FIG. 4, a visual inspection suggests that all three signals have similar magnitude distributions. However, their transitions in and out of different regions are highly asynchronous. The first and second samples appear to be more similar to one another as a whole (i.e., the number and size of peaks), while the third sample exhibits a much "cleaner" signal (with only one small peak). Correlations between each of the three sample signals may be calculated using any suitable method. Using such correlation methods, one may observe that aggregated signal samples 1 and 2 are both more correlated with (or more similar to) sample 3, rather than with each other.

On the other hand, if the duration feature vector for each signal is first collected and then the correlation among the resulting three vectors is computed, aggregate signal samples 1 and 2 are shown to be more correlated in their duration distribution. This is a known problem associated with such correlation calculations, and the typical remedy is to perform the above correlation computation for every possible time shift between two signals and select the highest in order to catch phase information.

However, such a correlation is computationally intensive (and therefore potentially slow), since there is typically on the order of 300 possibilities between each pair of signals. Moreover, in order to perform grouping, or clustering of similar features, this similarity measure needs to be calculated for each pair in the entire dataset of N prefixes, resulting in a complexity of $O(N \times N)$. By contrast, the feature vector representation has linear complexity $O(N)$ since the vector is extracted for each aggregate signal independently. Thus, such a procedure provides an advantage of being highly efficient for large datasets. For example, using the example once per day sampling period over several months, a typical number N of prefixes may exceed 360,000.

Clustering Along Each Feature

In accordance with an embodiment, a clustering procedure is implemented that separates the prefixes into groups of different dynamic behavior along each feature. Specifically, the set of intensity vectors, one extracted from each prefix, is sorted into different clusters. The same procedure is then repeated for the set of duration and frequency vectors, respectively. As will be appreciated by those of ordinary skill in the relevant art(s), it is unclear a priori how many clusters is an appropriate choice when clustering unlabeled data, e.g., by using the classical K-means method. Therefore, embodiments include clustering module 134 including instructions that, when executed by processor 114, cause processor 114 to execute a spectral clustering algorithm that identifies the right value of K in addition to identifying the clusters.

For example, for a signal $r_i(t)$, processor 114 may execute instructions stored in extraction module 132 to extract feature vectors $\lambda_i$, $d_i$, $f_i$. However, rather than operating over the entire feature matrix (3×3), processor 114 may execute instructions stored in clustering module 134 to perform a clustering operation over each feature vector (also referred to as dimension) separately, and then combine all possibilities, without loss of generality.

For example, consider a set of N prefixes, denoted $\mathcal{P}_N$, and the associated set of vectors $\{x_i, i \in \mathcal{P}_N\}$, which contains vectors of the same feature. Processor 114 may repeat a spectral clustering procedure is three times, once for each feature. For this reason, embodiments include the use of x to denote a generic feature vector in the discussion below; it can represent $\lambda$, d, or f.

Any suitable clustering algorithm may be stored in clustering module 134 and executed by processor 114. In an embodiment, the algorithm utilizes the similarity between two feature vectors (extracted from two prefixes in accordance with the instructions stored in extraction module 132) calculated as a correlation coefficient averaged over the three values in the vector. This calculation may be further illustrated by Eqn. 1.2 below:

$$R_{(i,j)} = \frac{1}{H} \sum_{h=0,-1,1} 2 \frac{x_i(h) \cdot x_j(h)}{x_i^2(h) + x_j^2(h)} \quad \text{Eqn. 1.2}$$

With reference to Eqn. 1.2, H=3 represents the size of the vector. The constant 2 normalizes the auto-correlation term ($R_{(i, j)}$) to unit value. Embodiments include the similarity being further normalized and used as an exponent to construct a similarity matrix X following the application of spectral clustering. Eqn. 1.3 illustrates an example used to determine an appropriate number of cluster based on the spectral analysis, which may be executed by processor 114, for example, using instructions stored in clustering module 134.

$$\sum_{i,j} = e^{\frac{R_{(i,j)}}{2\sigma^2}}, \quad \text{Eqn. 1.3}$$

$$L = D^{-\frac{1}{2}} \cdot \sum \cdot D^{-\frac{1}{2}}$$

Using Eqn. 1.3, this algorithm may be executed by processor 114 to derive the appropriate number of clusters by finding the top (i.e., dominant) K eigenvalues, $\alpha_i$'s, such that $\sum_{i=1}^{K} \alpha_i = \sum_{i=1}^{N} \alpha_i$ for some $\beta$ close to but less than 1. In accordance with such an embodiment, clustering module 134 includes instructions, that when executed by processor 114, results in K-means being performed over the selected K eigen-vectors. There are two main differences between the execution of this algorithm versus a typical spectral clustering method. First, a normalized distance is used as illustrated in Eqn. 1.2. Second, a byproduct of the algorithm as illustrated in Eqn. 1.3 is used to determine the eigenvalues for choosing K.

As a result, for a dataset with N signals, the algorithm executed by processor 114 involves eigen-decomposition over an N×N matrix, which is computationally intensive for typical values of N>360,000. Thus, embodiments include modifying this algorithm by first applying it to a randomly selected $N_o$ prefixes, where $N_o \ll N$, for the purpose of training and obtaining the top K eigenvectors. The cluster centers $\mu_1 \ldots \mu_k$ may be defined as the average among those trained clusters. For the remaining prefixes outside the training set, prefix i is assigned to the k*-th cluster if its feature vector $x_i$ is the closest to $\mu_k^*$, i.e., if $k^* = \text{argmin}_k |x_i - \mu_k|^2$. Processor 114 may repeat the random sampling process until the cluster association results converges. As will be appreciated by those of ordinary skill in the relevant art(s), the computational savings is a result of the most computationally heavy element of spectral analysis being eigen-decomposition, which is on the order of $O(N^3)$ for an N×N matrix. By sub-sampling $N_o \ll N$, the complexity $O(N_o^3)$ is reduced. Although this is repeated, the number of rounds needed is typically on a small order compared with N. For example, as verified through experimentation, the clustering typically gets stable after about 20 rounds.

Although the above repeated random sub-sampling algorithm may suffer some performance loss in terms of the true K-cluster membership as opposed to using $N_o=N$, such a performance loss is typically minor for two reasons. First, the random sampling is balanced, i.e., in each round we sample a representative number of prefixes from each true cluster (i.e., proportional to the size of the cluster). Second, experimentation has also verified that a prefix is sampled with high probability as the process continues.

Exemplary Clustering Results

For illustrative purposes, the results shown are based on the union list; however, embodiments may also utilize individual lists. The results along each type are further discussed in the next section. In an embodiment, once processor 114 clusters each feature, there may be any number of eigenvalues for each clustered feature. However, to strike a balance between computational complexity and to provide an adequate separation between clusters, typical K values may be 3 or 4, for example. In an embodiment, K=3 clusters are used in the clustering process by processor 114 for each feature. Table 2 summarizes the main properties of the three clusters in each feature below.

TABLE 2

| Cluster | Intensity | Duration | Frequency |
| --- | --- | --- | --- |
| 1 | Low in all 3 elements | Long good durations | High good frequency |

TABLE 2-continued

| Cluster | Intensity | Duration | Frequency |
|---|---|---|---|
| 2 | Medium in all 3 elements | Short bad/good durations | High normal frequency |
| 3 | High in all 3 elements | Long bad durations | High bad frequency |

Since each feature vector consists of three values (for the normal, good, and bad regions), a cluster is more completely described by characterizations of all three, although this would be somewhat cumbersome. Therefore, in the interest of brevity, Table 2 highlights the main/dominant property of each cluster. For instance, along the intensity feature, cluster 2 represents those prefixes whose intensity is medium in all three elements/regions, while for the duration feature, cluster 1 most prominently represents those prefixes whose durations within the good regions are long, and so on.

These clusters in each feature are illustrated in FIGS. 5A-C. FIGS. 5A-C illustrate example graphical plots of the results of clustering over various features, in accordance with an embodiment. For example, FIG. 5A illustrates an example graphical plot of the results of clustering over an intensity feature, FIG. 5B illustrates an example graphical plot of the results of clustering over a duration feature, and FIG. 5C illustrates an example graphical plot of the results of clustering over a frequency feature.

As shown in FIGS. 5A-C, for each feature, clusters 1, 2, 3 are color coded by red, yellow and black, respectively. As shown in FIG. 5B, there is a recurring linearity in cluster 1 (red). This is due to signals with very small number of region transitions, e.g., only once in the entire trace, and noting that in such cases the three duration values add up to the time horizon, giving rise to the linear relationship. As shown in FIG. 5C, the graph is in 2-D because the three values of the frequency vector must sum up to one, so that there are only two degrees of freedom Profile Analysis Using the feature-based clustering described in the previous section, embodiments include combining these clusters into profiles or patterns to build a concise representation of the dynamic behavior of a prefix seen from the RBL dataset. The profiles, or patterns, discussed below may be generated by processor 114 using executable instructions stored on profiling module 136, for example.

As previously discussed, a given prefix will fall into a particular cluster along each of the three intensity, duration, and frequency features. To illustrate this, a triple notation [m,n,l] is used to index the cluster a particular prefix falls in with regards to the intensity, frequency, duration features, respectively, where m,n,l may each have weighted values of 1, 2, or 3. Embodiments include combining all three features with three levels each results in a total of 27 possibilities, from which the profiles or patterns are derived. In the discussion below the two terms "pattern" and "profile" are used interchangeably.

FIGS. 6A-6D illustrate example graphical plots of various aggregate signal profiles indicating certain malicious activities, in accordance with an embodiment. These profiles may be further described in terms of the malicious network activity they represent, as further discussed below, for example.

[1,1,1]: This is the "cleanest" type of prefixes, as shown in FIG. 6A. By the characterization given in Table 2, the prefixes show small average magnitude in all regions, long durations in good regions and high frequency of visiting a good region.

[1,2,2]: Compared to [1,2,1], this profile type is more persistent and stable in the normal region and does not visit good regions as often, as shown in FIG. 6B.

[3,1,1]: These type of prefixes tend to stay clean for relatively long periods of time, but when it does enter a bad region the magnitude is higher compared to patterns such as [1(2),•,•], as shown in FIG. 6C.

[3,3,3]: This is the worst kind, with high intensity, longer duration, and higher frequency of bad regions, as shown in FIG. 6D.

As will be appreciated by those of ordinary skill in the relevant art(s), unique advantages of these profiling methods are a result of a higher resolution compared to using only average magnitude. The example provided below further illustrates why this high-resolution description is useful.

For example, FIGS. 6C and 6D show the dynamic aggregate signals of two different prefixes (from the union list) which have the same average magnitude. However, using the previously described embodiments to profile these aggregate signals, the aggregate signals are labeled as patterns [3,1,1] and [3,3,3] respectively. This captures the underlying differences in the way the level of observed malicious activity changes over time. For example, a [3,3,3] labeled prefix exhibits RBL activity that shows high variation over time (high intensity, long bad duration, high bad frequency), while that from a [3,1,1] prefix is relatively more stable (long good duration) yet more susceptible to positive changes (high good frequency).

Profiling Different Types of Malicious Activity and Incident Prefixes

The union list was previously utilized to describe the profiling methodology. In accordance with an embodiment, the previously described profiling procedure is repeated using each of the three type-specific lists: spam, scan, and phishing. Specifically, in accordance with such embodiments, type specific sets of aggregate signals may be generated (e.g., by processor 114 executing instructions stored on signal generation module 130) using one of the spam, phishing, and scan lists. Then, the same clustering algorithm is applied over the set of feature vectors extracted from these type specific aggregate signals, which again results in three dominant clusters in each feature, yielding the same set of labels to denote the patterns. However, since the feature clusters are generated over different sets of vectors, their boundaries are not necessarily the same as we move from one set to another (e.g., between those extracted from the spam list and those from the scan or the phishing list). Nevertheless, the physical meaning of these clusters, i.e., those more distinct properties given in Table 2, remains unchanged.

Figure 7:
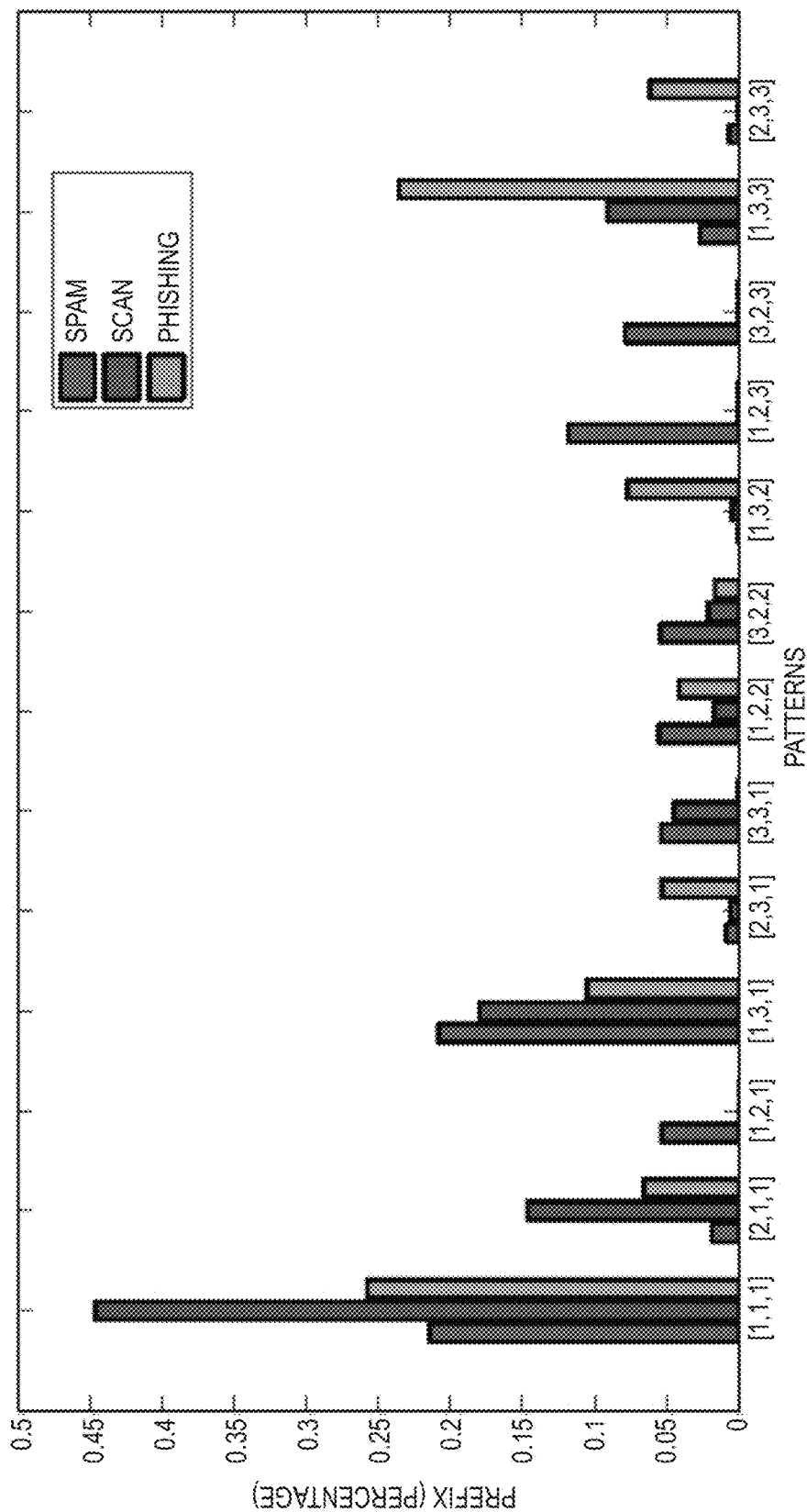
FIG. 7 illustrates an example graphical plot of a distribution of prefixes over patterns as a fraction of the total number of prefixes in the general population (360K prefixes) when focusing on each of the malicious activities types separately, in accordance with an embodiment.

FIG. 7 illustrates an example graphical plot of a distribution of prefixes over patterns as a fraction of the total number of prefixes in the general population (360K prefixes) when focusing on each of the malicious activities types separately, in accordance with an embodiment.

There are clear differences in the nature of different types of malicious activities. For example, when only the scan RBL data is used, a large representation in the [1,1,1] profile is observed, which indicates that these prefixes in general were sparsely used, were used over short periods of time, and tend not to be heavily re-used.

The phishing activity, on the other hand, reveals a higher presence in profiles [1,3,3] and [2,3,3]; this indicates that prefixes related to phishing activity exhibit such behavior in only small parts of the prefix, but these incidents are in general long lasting. Finally, this analysis also indicates that the spam RBL data exhibits a distribution that is well distributed across the different patterns. The spam RBL data's relatively high presence (20%) in low intensity patterns may suggest that there are a lot of large prefixes used for spamming, so that while the number of IPs listed may still be significant, they present a relatively small portion of the size of that prefix, as the signal magnitude is defined as the fraction of a prefix listed due to varying size of prefixes. The trends over patterns for different types of RBLs also highlight how these activities result in different observed dynamics of the malicious activity signal.

large fraction of IP addresses involved in malicious activities. Prefixes in [3,1,1], as previously shown in FIGS. 6A-D, go back to benign after being intensively used for malicious activities for a short period of time. Therefore, the prefixes in [3,3,3] have very similar characterizations, but are very different to those in [3,1,1]. Table 3 below shows the top 10 prefixes (for a typical sample RBL list collected over a period of 9 months and sampled once per day) with the highest intensity in both patterns based on the union lists.

TABLE 3

|  | Prefix | Network Owner | Classification | Country | Network Type |
|---|---|---|---|---|---|
| Rank in [3, 3, 3] | | | | | |
| 1 | 112.215.65.0/24 | PT Excelcomindo Pratama | [0.66, 7.28, 0.22] | ID | GPRS/GSM |
| 2 | 130.193.145.0/24 | Newroz Telecom Ltd. | [0.63, 8.75, 0.20] | IQ | N/A |
| 3 | 91.151.138.0/24 | Geocell LTD. | [0.62, 14.27, 0.32] | UK | N/A |
| 4 | 5.44.39.0/24 | "Baksell LTD" LLC | [0.62, 7.58, 0.18] | AZ | GSM/3G |
| 5 | 41.254.2.0/24 | Libyan Telecom and Technology | [0.61, 7.58, 0.18] | LY | N/A |
| 6 | 197.252.1.0/24 | Sudani-Huawei-WCDMA | [0.59, 13.05, 0.33] | SD | CDMA |
| 7 | 212.96.69.0/24 | Tele2 Sverige AB | [0.59, 9.13, 0.23] | SE | Mobile |
| 8 | 186.123.133.0/24 | AMX Argentina S.A. | [0.58, 7.29, 0.23] | AR | GSM |
| 9 | 190.113.208.0/23 | America Movil Peru S.A.C. | [0.57, 7.41, 0.23] | PE | Mobile |
| 10 | 91.151.136.0/24 | Geocell LTD. | [0.56, 10.33, 0.24] | UK | N/A |
| Rank in [3, 1, 1] | | | | | |
| 1 | 206.206.175.0/24 | Oso Grande Technologies, Inc. | [0.37, 29.85, 0.55] | US | Data center |
| 2 | 197.239.66.0/24 | Airtel-BF. | [0.37, 20.93, 0.51] | BF | N/A |
| 3 | 200.77.172.0/24 | Cablevision, S.A. de C.V. | [0.35, 29.85, 0.55] | MX | N/A |
| 4 | 190.56.253.0/24 | Telgua | [0.35, 21.75, 0.52] | SA | GSM/3G |
| 5 | 190.56.254.0/24 | Telgua | [0.35, 21.75, 0.52] | SA | GSM/3G |
| 6 | 200.77.173.0/24 | Cablevision, S.A. de C.V. | [0.33, 29.85, 0.55] | MX | N/A |
| 7 | 75.127.81.15/32 | Global Net Access, LLC | [0.32, 23.05, 0.56] | US | Data center |
| 8 | 64.22.82.133/32 | Global Net Access, LLC | [0.32, 23.05, 0.56] | US | Data center |
| 9 | 207.66.34.0/24 | Oso Grande Technologies, Inc. | [0.31, 29.85, 0.55] | US | Data center |
| 10 | 123.231.48.0/21 | Dialog Axiata PLC. | [0.31, 27.72, 0.53] | LK | GSM/3G |

In accordance with embodiments, based on the profile of a given prefix, the malicious activities for that prefix may be involved in can be estimated using conditional probability. For example, if a prefix is profiled as [1,3,3], it would have a tendency to be involved in phishing activity, whereas a prefix with a profile of [1,1,1] would most likely be involved in scan activity. As will be appreciated by those of ordinary skill in the relevant art(s), this proportional difference sheds light on pattern-based detection/forecast. For example, Bayes rule based methods may be implemented (e.g., via execution of instructions stored on profiling module 136 by processor 114) to predict upcoming malicious activities using these profiles.

An Examination of the Worst and Best Profiles

The prefix distribution (see FIG. 7 for reference) gives a general idea of the portion of prefixes exhibiting certain kind of dynamic behavior. More specifically, for a typical sample RBL list collected over a period of 9 months and sampled once per day, over 20% of the prefixes were classified into the [1,1,1] profile (low intensity, duration, frequency), over 15% in the [1,3,1] profile (high duration but low intensity and frequency), and roughly 10% in [1,2,3] (low intensity, moderate duration, high frequency) and [2,2,3] patterns.

However, to determine whether the profiles are in some way related with underlying use of these prefixes, embodiments include the consideration of two specific profiles are anticipated to be associated with poor network hygiene: the profiles [3,3,3] and [3,1,1] are compared. Expanding upon the previous explanation of profiles, prefixes in [3,3,3] represent the worst networks, which consistently have a A closer look at the composition of these two lists reveals that the types of networks in these two clusters are different. A large number (60%) of prefixes in [3,3,3] appear to belong to mobile network operators, while the [3,1,1] list is heavily populated (40%) with small data centers that provide cloud hosting services. Additionally, there are several possible reasons to the association between mobile services and the [3,3,3] pattern. In general, one expects the dynamic portions of the address space to have higher intensity and experience more dynamic changes as devices come on and off and migrate to different addresses in the given pool. This is confirmed by reverse DNS lookups for IP addresses from these prefixes: the phrase "dynamic" or "dyn" or "pool" appears quite frequently. In addition, various references to 3G/mobile services are observed such as "wimax," "triband," "gprs," "cdma," and "apn."

On the other hand, the association between cloud services and [3,1,1] is more intriguing. By inspecting individual aggregate signals (as shown earlier in FIG. 6C), these cloud services are generally well run and maintained (giving rise to the [.,1,1] classification), but were observed sending malicious traffic/spam rather heavily once or twice during the 9-month period (each time lasting 1-3 months). By cross referencing these prefixes with other well-known sources, such as Global spamming Rank lists, for example, these observations are consistent with the use of these prefixes for spam activity, and the dramatic reduction may be attributed to clean up of Kelihos or other spam malware on these prefixes. This once again illustrates the value of using the features to build profiles of malicious activity.

The above observations are derived based on the union list. As will be appreciated by those of ordinary skill in the relevant art(s), a similar analysis may be performed by looking at each type-specific list separately, and thus the general conclusions are the same with a few minor differences. For instance, GSM network related prefixes are more prominent in the worst 10 spam list, while some domain services and security companies appear on the scan list perhaps due to legitimate activities, Furthermore, online shopping websites and data center appear in the worst 10 prefixes for phishing lists.

Aggregating Profiles

Various embodiments include aggregating various network level entity profiles (e.g., prefix level profiles) up to higher level entities such as the Autonomous System (AS), domains, or countries in order to get a basic understanding of how these might be reflective of general network security administrative policies and regional trends. In an exemplary embodiment, this profile aggregation may be performed by processor 114 by executing instruction stored in profile aggregation module 138, for example.

TABLE 4

| Best-Pfxs | ASN | Network Owner |
|---|---|---|
| 4417 | 5089 | NU Virgin Media Limited |
| 1463 | 7029 | Windstream Communications Inc |
| 696 | 4538 | ERX-CERNET-BKB China |
| 607 | 33363 | BRIGHT HOUSE NETWORKS |
| 584 | 4323 | TW Telecom |

| Worst-Pfxs | ASN | Network Owner |
|---|---|---|
| 513 | 9829 | BSNL |
| 356 | 6147 | Telefonica del Peru |
| 242 | 36998 | SDN-MOBITEL |
| 226 | 24560 | AIRTELBROADBAND |
| 214 | 45899 | VNPT Corp |

Again, using a typical sample RBL list collected over a period of 9 months and sampled once per day, Table 4 shows the top 5 ASes that were categorized in the best [1,1,1] and the worst [3,2,2] and [3,3,3] patterns on the basis of the number of prefixes they contribute to that pattern. In general, Table 4 shows that large, well-established ISPs such as QWEST, UUNET, AT&T, TATA Communications, Level 3, and cogent are among the top 50 ASes, constituting the most prefixes of pattern [1,1,1]. Table 4 also shows that those constituting the largest presence in the worst patterns include smaller ISPs such as BSNL, Airtel, Vietel, Kazakhtelecom, and Iran Cell Service Company. It is interesting to note that BSNL, which ranked as the worst in the worst AS list, was actually the target of malicious attack in October 2013 and appears in our incident dataset as well. This is further discussed in the next section.

Using this aggregated profile data, processor 114 by may executing instructions stored in profile aggregation module 138, the countries to which the prefixes in the worst profiles ([3,3,3], [3,2,2]) and [3,1,1] belong may be determined. When this was performed experimentally using the sample data, the overall geographical distributions are greatly varied but some high level regional trends do arise. In particular, there were over 1.65K prefixes from India, 587 from Vietnam, 388 from Iran, 366 from Peru, and 340 from Kazakhstan. By contrast, of the almost 75K prefixes in [1,1,1], one-third came from the US, 5.8K from UK, 4.6K from Brazil, 3.1K from China and 2.7K from Russia. Additionally, it is also possible to examine the prefixes in a given network profile and aggregate by DNS domain information on the basis of reverse DNS lookups. Specifically, when the prefixes in the [3,3,3] profile were examined the .edu, .com, or .net TLDs are rarely seen in these reverse lookups; instead we see mostly country based Top Level Domains (TLDs) such as .in, .kz, .id, .vn and .ua, which confirm our country level aggregations.

Example Applications

The aforementioned malicious profiling process may be incorporated, in various embodiments, for a number of practical applications. As previously discussed, the monitored network traffic may be aggregated and profiles according to the monitored dynamics of the malicious network activity. For example, sets of IP addresses may be grouped according to common prefixes, AS types, etc., and profiles generated in the form of [1,1,1] to [3,3,3] as an indication of the intensity, duration, and frequency of malicious behavior of each group over a sampling period.

In an embodiment, these profiles may be further weighted as desired based on a selected intensity, duration, or frequency feature to determine a maliciousness score based on the selected feature. For example, if a user is operating a network in which duration is of more importance that the other features, then processor 114 may weight the profiles accordingly to determine a score executing instructions stored on profiling module 136. In accordance with such an embodiment, processor 114 may utilize a user-supplied feature selection from I/O interface 108, for example. In accordance with such embodiments, processor 114 may assign weights to each of the intensity, duration, and frequency features, respectively, for each of the plurality of maliciousness profiles such that heaviest weight is associated with the selected one of the intensity, duration, and frequency features. Thus, processor 114 may determine a plurality of maliciousness scores for each of the plurality of maliciousness profiles, respectively, based on a weighted combination of each of the intensity, duration, and frequency features.

Scoring the profiles using weighted features in this manner allows a user to easily see a relationship between maliciousness scores of different profiles based on the same maliciousness feature weighting. In other words, weighting the dynamic aspects of each profile yields a linearized score that allows a user to quickly ascertain a level of maliciousness across several profiles even though each profile represents dynamic feature properties. For example, comparing maliciousness across two profiles [3,1,1] and [1,1,3] is difficult to do, since the first profile is associated with a bad intensity while the second profile is associated with bad frequency. By applying a selected weighting value that is higher for the intensity feature but lower for the other two features, a linearized scoring may be generated. The results of this linearized scoring may be any suitable numeric system. For example, a typical scoring system could include ranges of 1-10 with 1 being the worst, 1-100 with 1 being the worst, etc.

In various embodiments, a network may be directly scored based on a particular aggregated signal at any suitable time during the sampling period. For example, using the previous example of sampling the network traffic once per day for a period of 9 months, a network may be scored by determining the aforementioned feature sets for a respective aggregated signal on a daily basis. Although this score will only reflect a respective magnitude for the aggregated signal on each day, keeping track of the trending of this score would have a similar effect as scoring the profile, which already takes into account the dynamic property of the aggregate signal.

In various embodiments, the features extracted from the network-level malicious activities, as well as its profiles, may be used to train a classifier, e.g., the Support Vector Machine (SVM) or Random Forest (RF) classifiers. Specifically, by combining network features with labels (known information on whether a network has suffered from a recent security incident or data breach) to train a classifier, the classifier can subsequently be used to predict or forecast the likelihood of a network suffering from a future security incident.

Selective Routing

In accordance with various embodiments, network analyzer 100 may be implemented as part of a routing system. In accordance with such embodiments, network analyzer 100 may route IP addresses associated with sets of aggregated IP addresses having a first malicious profile and/or score to a first router while routing IP addresses associated with sets of aggregated IP addresses having a second malicious profile and/or score to a second router. Such an application may be preferable when, for example, the first malicious profile is indicative of a higher maliciousness than the second malicious profile, thereby routing the IP addresses to the first router to provide a lower cost and/or quality of service. In this way, selective routing may be used to route IP addresses associated with certain sets of IP addresses (i.e., having the same prefix, AS type, etc.) that are more likely to be malicious to lower quality (and typically lower cost) networks and/or routers accordingly.

In addition, selective routing embodiments may also utilize a best path selection procedure to preferentially route sets of aggregated IP addresses associated with a better malicious profile and/or score while avoiding routing of the IP addresses to sets of aggregated IP addresses having a worse malicious profile and/or score.

Selective Packet Inspection

In accordance with various embodiments, network maliciousness scores and/or profiles may be utilized to implement selective packet inspection. For example, network traffic may be monitored such that sets of IP addresses associated with worse maliciousness scores and/or profiles may be subjected to deep packet inspection (DPI) while other sets of IP addresses associated with lower maliciousness scores and/or profiles are not. In this way, more expensive deep packet inspection devices may be used more sparingly and efficiently within a network.

Network Risk Assessment

In accordance with various embodiments, network analyzer 102 may be implemented to assess a risk level (e.g., as a numeric score indication, a scaled rating, etc.) of a monitored network based on a number of maliciousness profiles and/or scores calculated for sets of IP addresses that are monitored over a given time period. In other words, networks having a great deal of network traffic associated with a higher maliciousness score and/or profile would be indicative of a higher risk. This risk information could be used as part of a risk assessment for network insurance purposes, for example. Using this risk assessment information, an insurance company may determine an insurance premium quote for insuring the network.

II. Similarity in Network-Level Maliciousness

As discussed with respect to Section I, there are several options for defining a network unit such as border gateway protocol (BGP) routed prefixes, Autonomous Systems (ASes), DNS domains, address ownership, etc. For the purposes of illustrating the embodiments discussed throughout this section, a network is considered as a BGP routed prefix. However, the embodiments described herein are equally applicable to any suitably defined network system.

Again, since the BGP prefix is the smallest network aggregate that is globally visible, this provides a level of resolution finer than those others mentioned above while being large enough to exhibit common aggregate traits. In this section, the maliciousness is examined at an aggregate level rather than at the IP level because the collective behavior of a network entity is sought to be determined, which typically exhibits greater stability as a result of more consistent policies being applied compared to the highly dynamic nature of individual IP addresses.

In this section, embodiments are explained with reference to a set of commonly used IP-address based host reputation blacklists (RBLs) that are collected over a long duration as representations of observed maliciousness. For example, when illustrative examples are provided, an RBL list may be collected in a similar fashion, as previously discussed with reference to FIG. 1. For example, the network data may be monitored for a period of several months and sampled once per day. A specific RBL data set was used throughout the section to illustrate the applicability of various embodiments, which used an RBL list collected over a period of 10 months (as opposed to the 9 month period in Section I) and sampled once per day.

Once again, these RBLs broadly cover three categories of malicious activities: spam, phishing, and active scanning. A network's maliciousness from the behavior observed from the vantage points of these RBLs. In doing so, an emphasis is placed on capturing the dynamic behavior of malicious activities, rather than an average over time. Specifically, the maliciousness of a network is determined by its presence on these RBLs (either collectively or by different malicious activity types) as a temporal process (e.g., the amount of IP addresses within the network that show up on these RBLs at any given time). In accordance with various embodiments, the similarity between two networks' maliciousness can then be measured by correlating the two corresponding temporal signals. Since the measurements of maliciousness are based on a time-varying process, the resulting similarity between two networks not only captures the similarity in the magnitude of their presence on these RBLs, but also captures any synchrony in their behavior. This aspect of the embodiments provides an advantage compared to typical existing maliciousness measurement techniques, which largely focus on measuring the level of malicious activities as a time average.

In various embodiments, a measurement of the relative proximity of two networks may be performed by considering a variety of spatial characteristics, with the details regarding these definitions provided in subsequent sections. For example, this proximity may be determined via execution of instructions stored in similarity module 140 via processor 114, the details of which are further discussed below.

The first type of proximity may be described in terms of AS membership: two prefixes belonging to the same AS are considered "close," or similar. The second type of proximity may be described in terms of AS type: two prefixes that belong to ASes of the same (business) type are considered close, or similar. The third type of proximity may be described in terms of AS connectivity: the physical distance between two prefixes as measured by the number of hops (direct connections) between the ASes they each belong to. The fourth type of proximity may be described in terms of country/geographical affiliation: two prefixes residing in the same country are considered close. As will be appreciated by those of ordinary skill in the relevant art(s), these spatial features are provided as examples, and any suitable spatial characteristics may be utilized.

The embodiments discussed throughout this section are directed to three concepts, among other things. First, a simple similarity measure is defined that that quantifies the relationship between two networks' dynamic malicious behavior. Second, statistical inference methods are described that are utilized to evaluate the significance (or the degree of resemblance) of the set of spatial features in explaining the observed similarity in malicious behavior. Third, the similarity measure and spatial features are used to either enhance temporal prediction results, or to help predict an unknown network, which would otherwise be infeasible to do so.

The RBL and Other Datasets

Similar to the network monitoring discussed with reference to Section 1, the embodiments in this section are described with reference to an IP-address based RPL collected over a period of time and sampled at regular intervals. Although the embodiments described in this section are not limited to the list shown in Table 5, this Table is provided as a reference in which to provide illustrative examples throughout this section. Similar to Table 1, the unique IP addresses shown in Table 5 include typical numbers of unique IP addresses of 164 million or more.

TABLE 5

| Type | Blacklist Name |
|---|---|
| Spam | CBL [2], SBL [10], SpamCop [8], WPBL [12], UCEPOTECT [11] |
| Phishing/Malware | SURBL [9], Phish Tank [6], hpHosts [4] |
| Active attack | Darknet scanner list, Dshield [3], OpenBL [5] |

In addition to the RBLs, the embodiments discussed in this section also implement sets of data on spatial and proximity features of networks which are extracted from BGP global routing table snapshots and other public information sources. The following are detailed examples of these spatial and proximity features:

1. AS membership, which reveals which prefix belongs to which AS.

2. AS types, which associates a given AS with one of four types based on their broad overall role in the Internet eco-system: Enterprise Customers (ECs), Small Transit Providers (STPs), Large Transit Providers (LTSs), and Content/Access/Hosting Providers (CAHPs). Such associations may be made sing any suitable method.

3. Country affiliation, which associates a given prefix with the country in which the prefix's owner resides.

AS distance (Hop), which gives the shortest hop count between a pair of ASes. Specifically, for prefixes within the same AS, their AS distance is considered 0. If they belong to ASes that can directly communicate (neighbors based on Internet routing), their AS distance is considered to be 1. Using the same adjacency information, we calculate the shortest path between any pair of prefixes; its length is then taken to be their AS distance.

Data Aggregation

While the following embodiments are explained through an analysis of the RBL data at an aggregate prefix level, any suitable aggregation of the RBL data may be used without departing from the spirit and scope of the disclosure. In an embodiment, the IP addresses on the RBL data list may be aggregated to the BGP routed prefixes that are collected by any suitable number of vantage points. In various embodiments, the prefix level aggregation can be done over a single blacklist or over some combined form of multiple blacklists (e.g., those belonging to the same type of malicious activities). Two versions of combination may be generated. First, all 11 lists may be combined in a union fashion (i.e., an IP is listed on the union list on a given day as long as it shows up on at least one of the individual blacklists), which will be referred throughout the section as the complete union list. Second, all lists may be combined within the same malicious activity type, which leads to three separate union lists, referred to as the Spam, Phishing, and Scanning lists, respectively.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In accordance with various embodiments, IP addresses may be aggregated from the RBL data at any suitable level, such as at the prefix level, for example. As previously discussed in section I, this aggregation may be performed by processor 114, for example, executing instructions stored in aggregation module 122. Also similar to the processes described in section I, processor 114 may obtain a discrete-time aggregated signal from the aggregated sets of IP addresses over a given union list to obtain a discrete-time aggregate signal for each prefix. In an embodiment processor 114 may generate the aggregated signals by executing instructions stored in signal generation module 130.

To illustrate the embodiments described herein, the aggregate signals may be denoted for each prefix (or other suitable aggregation) i, $r_i^U(t)$, $r_i^{sp}(t)$, $r_i^{ph}(t)$, $r_i^{sc}(t)$, t=0, 1, 2, . . . , for signals obtained from the complete union, spam, phishing and scanning lists, respectively. Again, as previously discussed, each aggregate signal may be generated in either a normalized or unnormalized form.

Measuring Similarity in Maliciousness

In an embodiment, a similarity measure may be defined between two aggregate signals $r_i^*(t)$ and $r_j^*(t)$ for two prefixes i, j, and examine to what extent these dynamic network-level malicious behaviors are similar to each other.

For illustrative purposes, let $r_i^*(t)$ and $r_j^*(t)$ be the vector form of aggregate signals $r_i^*(t)$ and $r_j^*(t)$, t=1, . . . , τ, respectively for some time horizon T. Then the temporal similarity between these two vectors can be measured by Eqn. 2.1 as follows:

$$S_{i,j}^* = \frac{2(r_i^*)^T \cdot r_j^*}{|r_i^*|^2 + |r_j^*|^2}, \forall i \neq j, \quad \text{Eqn. 2.1}$$

where T in the superscript denotes a transpose. Eqn. 2.1 is an example of a correlation algorithm that may be implemented by processor 114, in an embodiment. Eqn. 2.1 may be implemented as one or more parts of a correlation algorithm to determine how similar in shape two vectors may be. For example, Eqn. 2.1 may be implemented as one or more algorithms included in instructions stored in similarity module 140, which are executed by processor 114 to determine a temporal similarity. Given N prefixes, the collection of $N^2$ similarity values may be represented in a similarity matrix $S^*=[S_{i,j}^*]$.

As will be appreciated by those or ordinary skill in the relevant art(s), a potential issue with implementing such a correlation algorithm using Eqn. 2.1 may occur when one vector/signal has much higher magnitude than the other. For example, consider two vectors $r_i^*$ and $r_j^*$ such that $r_j^*=n \cdot r_j^*$ (i.e., j is n times of i component-wise).

Using this example, $$S_{i,j} = 2(r_i^*)^T \cdot \frac{nr_i}{|r_i^*|^2 + |n \cdot r_i^*|^2} = \frac{(2n)}{n^2+1},$$

which approaches 0 as n becomes large. In other words, two prefixes may have identical dynamic patterns in their malicious activities, but the large difference in magnitude will result in a very small correlation measure, and the opposite may also occur. Because prefixes may be of different sizes, a difference in magnitude may simply be due to the size difference after going through the normalization, and not in the actual amount of malicious activities (i.e. number of listed IPs).

In order to account for this, embodiments also include implementing one or more algorithms as part of instructions stored in similarity module 140 to generate a quantized version of the aggregate signal, denoted as $r_i^{q,*}(t)$, such that $r_i^{q,*}(t)=0$ if $r_i^*(t) \in [(1-\delta)\bar{r}_i^*, (1+\delta)\bar{r}_i^*], r_i^{q,*}(t)=+1$ if $r_i^*(t)<(1-\delta)\bar{r}_i^*$, and $r_i^{q,*}(t)=-1$ if $r_i^*(t)>(1+\delta)\bar{r}_i^*$. In other words, the quantized process $r_i^{q,*}(t)$ takes on three values $\{-1, 0, 1\}$, where 0 means that the signal is within a "normal" region (around its own time average), −1 means it is in a "bad" region (with a high level of malicious activities) and 1 means it is in a "good" region. These values could also be viewed as the "states" of the quantized process. For this quantized signal, the similarity measure between two vectors may be determined using Eqn. 2.2 as follows:

$$S_{i,j}^{q,*} = \frac{\sum_{t=1}^{\tau} \gamma^{H(r_i^{q,*}(t),r_j^{q,*}(t))}}{\tau}, \forall i \neq j,$$ Eqn. 2.2 where $0 \leq \gamma \leq 1$, and $H(\cdot,\cdot)$ is a Hamming distance between its two arguments. As a result, the weight is 1 for a given time instant if two signals have the same state and decreases by a factor of γ with the increase in difference in the states. This relationship, therefore, results in the establishment of a quantized similarity matrix $S^{q,*}=[S_{i,j}^{q,*}]$.

Similarity Graphs and Topological Interpretation

To illustrate the similarity measure, note that both $S^*$ and $S^{q,*}$ may be interpreted as weighted adjacency matrices of an underlying similarity graph $\mathcal{G}=(\mathcal{V},\varepsilon):\mathcal{V}$ being the set of N prefixes, E the set of weighted edges, with weights $S_{i,j}^*$ (or $S_{i,j}^{q,*}$) representing the closeness, or similarity, between two connected prefixes i, j$\varepsilon\mathcal{V}$. Thus, it is helpful to gain some intuition by visualizing these similarity graphs.

Figure 8C:
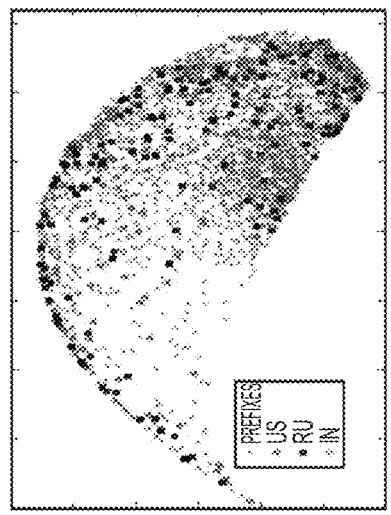
FIGS. 8A-8C illustrate example similarity graphical plots for three different types of malicious network behavior, in accordance with an embodiment.
Figure 8B:
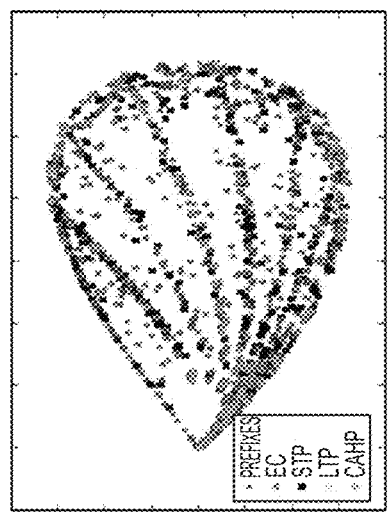
Figure 8A:
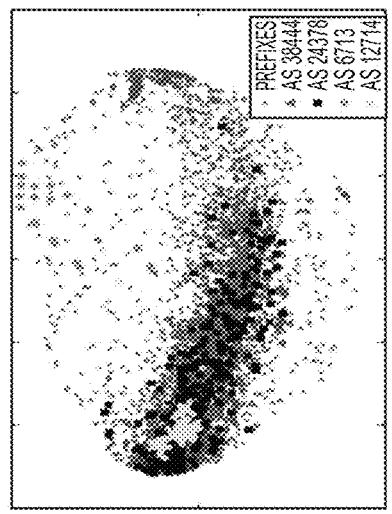

FIGS. 8A-8C illustrate example similarity graphical plots for three different types of malicious network behavior, in accordance with an embodiment. As shown in FIGS. 8A-8C, 2D planes indicate each point representing a prefix, the pairwise Euclidean distance between every two points being approximately inversely proportional to their edge weights. Thus, the closer two points are, the more similar the corresponding prefixes in their aggregate signals. The approximation is due to the fact that in computing the locations of these prefixes whose distances satisfy the set of pairwise similarity measures, the true answer generally lies in a higher dimensional space, in which case the 2D depiction is the projection of the true solution to the 2D plan, or a least-squares approximation.

For this reason, neither the scale nor the orientation of such a graph is particularly relevant, but the relative distances are. The graphs shown in FIGS. 8A-8B use similarity matrices $S^{sp}$, $S^{ph}$, and $S^{sc}$, each being generated by a union list for one of the malicious types, respectively. In an embodiment, the similarity matrices may be generated by processor 114, for example, through the execution of instructions stored in similarity module 140, for example.

In inspecting FIGS. 8A-8C, these similarity matrices illustrate clustering in all cases. However, there are differences in the clustering between the three similarity matrices. The spam data (FIG. 8A) shows a prominent single cluster, though it appears as a "belt", rather than a "ball"—it shows a type of "continuity" in similarity (i.e., successive neighbors are very close to each other but they collectively form a very large neighborhood). This type of continuity similarly exists in the scanning graph (FIG. 8C), though it appears that for scanning almost all prefixes belong to this single cluster, whereas in the case of spam there is a significant number of prefixes that lie outside the cluster.

This continuity is most observed in the phishing data (FIG. 8B), where the points form a clear set of curves/lines, since the sequence of prefixes share similar aggregate signals but with a progressive phase shift (or time delay), as if they captured the same signal propagating through them.

It is generally understood that spam activities are organized into a tiered system where workers obtain a spam workload from a higher level proxy agent while at the same time optimizing the bot structure by finding nearby nodes. Therefore, we can also expect that spam activities are organized as distinct campaigns. This is a result of IP addresses of worker bots being listed in various RBLs in a synchronized manner where nearby prefixes (most likely within the same AS) would demonstrate a higher degree of similarity. This behavior stands out in FIG. 8A where a high degree of clustering is observed due to each of the four highlighted ASes.

For phishing and malware spread, a phenomena referred to as fast-flux is commonly observed, whereby a single malicious domain is mapped to a constantly changing IP address. This leads to a single malicious event propagating through different prefixes over time, with the result that each of these prefixes exhibits high similarity in their dynamic behavior. This pattern is clearly seen in FIG. 8B. This explanation may be further clarified by illustrating an extraction of a set of prefixes from the top two curves of the phishing graph (FIG. 8B) and their corresponding aggregate signals.

FIGS. 9A-9B illustrate example graphical plots for the aggregate signals corresponding to selected prefixes corresponding to phishing activity, in accordance with an embodiment. A propagation group corresponding to prefixes selected from the first and second top two curves in FIG. 8B are shown in FIGS. 9A and 9B, respectively. As shown in FIGS. 9A-B, the propagation effect is clearly demonstrated. In addition, FIG. 8B shows that phishing activity is highly dominated by Content and Hosting Provider ASes.

As shown in FIG. 8C for the scanning graph, distributed ssh scanning has rapidly gained popularity as a mechanism to side-step simple rate based blocking counter measures. This is characterized by the use of a large number of unrelated distributed IP addresses to make only a few scanning attempts each at a time. In general, the IP addresses chosen are unlikely to be from a single or closely related set of prefixes so as to avoid drawing attention to this activity.

Furthermore, the graphs shown in FIGS. 8A-C are based on the un-quantized similarity matrices. Similar features would be observed in those generated by the set of quantized similarity matrices, however, although the quantized graphs would typically be more connected (higher average degree and smaller average eigenvalue) than the un-quantized graphs, which suggests that when viewed in discrete states that indicate the onset and departure of security incidences, the prefixes are even more similar to one another.

A Bayesian Inference Model Over Graphs

Figure 10:
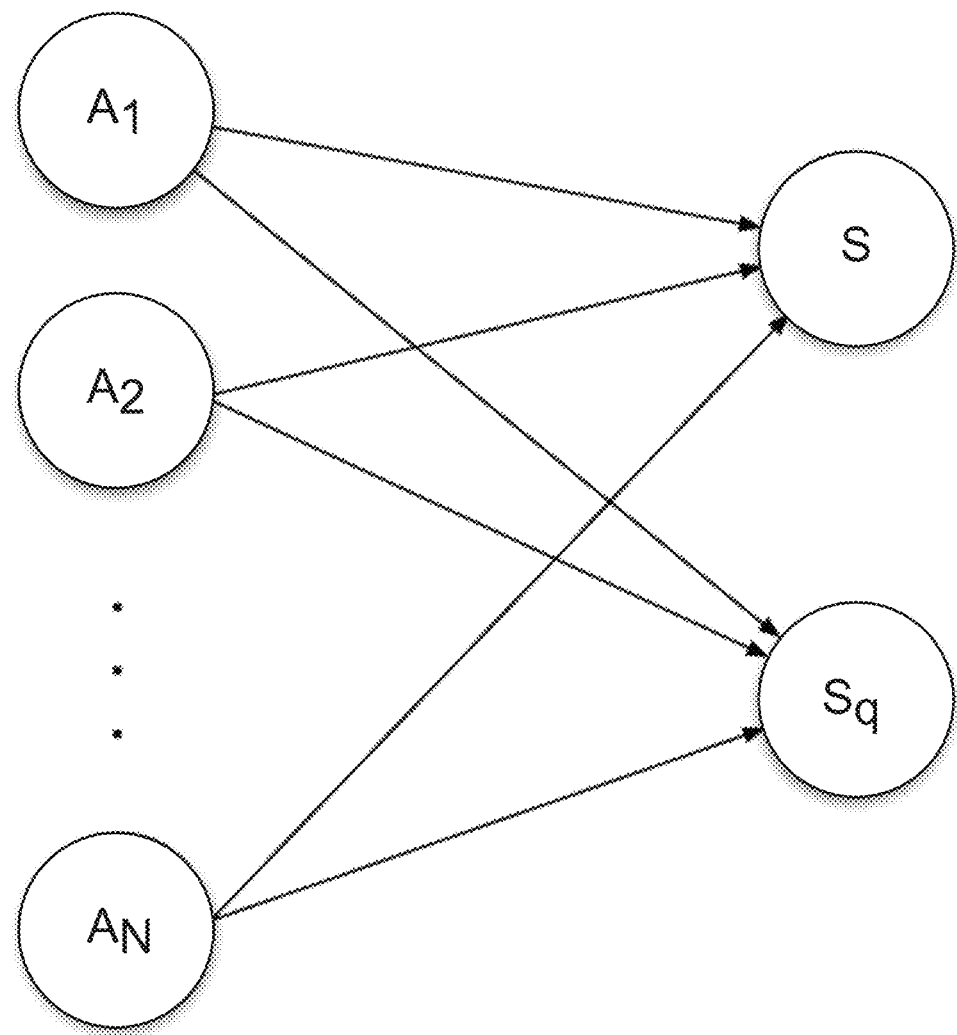
FIG. 10 illustrates an example graphical inference model, in accordance with an embodiment.

FIG. 10 illustrates an example graphical inference model, in accordance with an embodiment. To further clarify, FIG. 10 illustrates a correlation relationship sought to be quantified. As shown in FIG. 10, the right hand side (RHS), includes a set of observable variables/graphs given by the similarity matrices derived from the original aggregate maliciousness signals and from the quantized versions of these signals, respectively. These represent the behavioral similarities between networks directly observed from the data. The left hand side (LHS) shows a set of latent (or relational) variables or graphs given by similarity matrices derived from known relationships between the networks. These known relationships may include spatial similarities, such as those derived from information on AS membership, AS type, AS hop count, and country affiliation, for example. The edges shown in FIG. 10 are directed, but this does not imply a causal relationship between the LHS and the RHS. The directionality is for illustrative purposes and indicates that one side is latent. That is, it includes factors that may act in known or unknown ways. In contrast, the while the other side is active (i.e., the manifestation seen in actual behavior). The quantized similarity matrix $S^{q,*}$ on the RHS is included on the RHS as an observed matrix because, as discussed earlier, the quantized version may help reduce bias introduced by the normalization of data and more effectively capture synchronized behavior.

In an embodiment, an inference regarding the edge weights on all directed edges may be determined given the two sets of similarity matrices. In accordance with such an embodiment, these edge weights may be interpreted in are different ways. First, the weights convey the relative strengths of the correlation between latent variables and observed variables, e.g., which relation-ship factor best explains, or resembles the most, the similarity seen in the actual data. However, if causal relationship between the two sides could be established through separate means, then these edge weights may also indicate to what degree a latent variable contributes to and/or causes the observation.

As previously discussed in the previous section, embodiments include deriving observed similarity matrices. In addition, embodiments include deriving latent relational similarity matrices among N number of prefixes (or other suitable spatial grouping). Using N prefixes as an example, each of the similarity matrices among N prefixes may be represented mathematically as N×N matrices symmetric about the diagonal. Examples of the similarity matrices are provided below:

$A_1$ denotes an exemplary AS-membership similarity matrix. Such a matrix entry $A_1(i, j)=1$ if prefixes i and j belong to the same AS, and $A_1(i, j)=0$ otherwise.

$A_2$ denotes an exemplary AS-type similarity matrix. Such a matrix entry $A_2(i, j)=1$ if prefixes i and j belong to ASes of the same type (or belong to the same AS), and $A_2(i, j)=0$ otherwise.

$A_3$ denotes an exemplary AS-distance similarity matrix. Such a matrix entry $$A_3(i, j) = \frac{K}{h(i, j)},$$

where K is a scaling factor used to make this matrix consistent with others, and h(i, j) denotes prefixes i,j's AS distance or hop count as previously discussed.

$A_4$ denotes an exemplary country-affiliation similarity matrix. Such a matrix entry $A_4(i, j)=1$ if prefixes i and j are owned by entities (companies, organizations, etc.) residing in the same country, and $A_4(i, j)=0$ otherwise.

In accordance with an embodiment, processor 114 may calculate relevant similarity matrix values by performing correlation with multiple latent variables jointly, as opposed to computing the correlation pair-wise (e.g., by directly correlating $A_1$ and S, followed by $A_2$ and S, and so on). This is because the latter method may provide results from pairwise correlations that are not consistent and cannot be easily compared or interpreted. This is due to the fact that each time a correlation is performed (e.g., by projecting S onto Ai) and the least-square fit $S \approx \alpha_i A_i$, is obtained, that the quality/error of that projection (i.e., $\|S - \alpha_i A_i\|F^1$) varies as $A_i$ is varied. Consequently, the correlation $\alpha_i$'s are not necessarily comparable. In contrast, embodiments include processor 114 determining an inference by projecting S onto the space spanned by all of the $A_i$'s. As a result, the correlation with each $A_i$ is therefore consistent with one another and indicates relative strength.

A Multi-Layer Graphical Inference Model

As will be appreciated by those of ordinary skill in the relevant art(s), directly solving the inference problem illustrated in FIG. 10 can be computationally intensive, as it involves the simultaneous determination of X×Y edge weights and the simultaneous manipulation of X+Y matrices, X being the number of latent matrices and Y being the number of observed matrices. Therefore, in accordance with an embodiment, processor 114 may be configured to execute instructions stored in similarity module 140 to implement one or more solutions in accordance with a multi-layer inference model, which is illustrated in FIG. 11.

Figure 11:
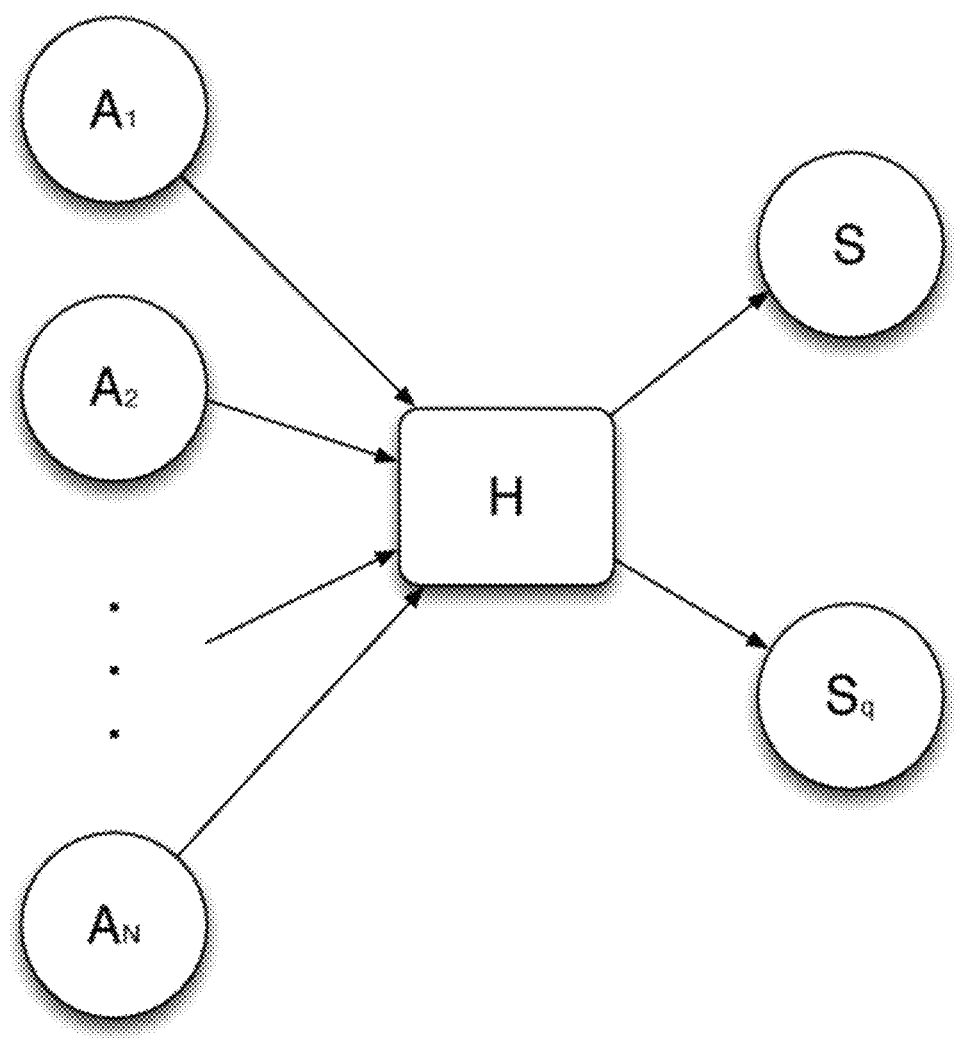
FIG. 11 illustrates an example multi-layer graphical inference model, in accordance with an embodiment.

FIG. 11 illustrates an example multi-layer graphical inference model, in accordance with an embodiment. As shown in FIG. 11, a "hidden" similarity matrix H serves as an intermediate step between the LHS and the RHS. In accordance with such an embodiment, correlation between the latent matrix and this hidden H, and between H and the observed matrices may be separately established.

The hidden matrix H is not necessarily a pure mathematical construct. In various embodiments, the hidden matrix H has a real physical interpretation. For example, in the case of spam the observed spam activity of a given network is ultimately determined by how many hosts in that network were taken over as proxies by a spam campaign. Furthermore, the number of such hosts may be viewed as determined by the likelihood a network is targeted by the spam campaign as well as its vulnerability in falling victim when targeted. The similarities in these probabilities may be regarded as the hidden H matrix. In other words, the similarity observed on the RHS may be ultimately attributed to the similarity in this probability similarity matrix H. This reasoning may be extended to other type of malicious activities. Therefore, the set of spatial features may be correlated with the observed matrices through this hidden similarity matrix H.

As a result of the introduction of H, embodiments advantageously solve the problem through the following decomposition and matching procedure more efficiently as compared to direct solving and without having to invoke unknown priors commonly used in typical correlation processes.

The LHS problem may be explained as the inference of H using the latent variable matrices $\{A_i\} \to H$.

The RHS problem may be explained as the inference of H using the observed matrices S, $S^q \to H$.

In both cases, H is initially unknown. Therefore, embodiments include estimating H as a linear combination of the $A_i$'s and of the $S_i$'s using two sets of edge weights $\{\alpha_i\}$ and $\{\beta_i\}$, respectively. Then, processor 114 may execute instructions to solve both problems simultaneously, in an embodiment. For example, processor 114 may estimate the two sets of edge weights by minimizing the difference between the two inferred versions of the hidden matrix H: $H_\alpha$ and $H_\beta$. The linear model allows a restriction to the best linear fit in estimating H given the set $\{A_i\}$. Physically, this may be interpreted as estimating H as its projection onto the space spanned by $\{A_i\}$. Under certain conditions, it can be shown that the optimal inference of H is indeed given by a linear model, the details of which are provided in Appendix 1.

Accordingly, the above inference problem may be solved by one or more algorithms executed by processor 114 based on the following math program:

$$(P\_BI) \min_{\alpha,\beta} \|H_\alpha - H\beta\|_F$$

$$s.t. H_\alpha = \Sigma_i \alpha_i A_i$$

$$H_\beta = \Sigma_i \beta_i S_i$$

$$\Sigma_i \alpha_i = 1, \Sigma_i \beta_i = 1$$

Note that the constraints used in the above math program are linear in $\alpha$, $\beta$, while the objective $|\bullet|_F$ is convex. Meanwhile $H_\alpha - H_\beta$ is a linear operation over $\alpha$, $\beta$. As a result, (P_BI) is also convex and may be solved efficiently.

Inference Using the RBL Dataset

In an embodiment, the multi-layer graphical inference model may be applied to a collected RBL dataset, such as the RBL datasets previously discussed with reference to Table 5, for example. For example, applying the multi-layer graphical inference model to the example RBL dataset for each month over the aggregate signal and its quantized version (i.e., the union similarity matrices $S^U$ and $S^{q,U}$) may result in an inference of various spatial features as the aggregated signal is sampled at each month throughout the sampling period. Using the RBL dataset previously discussed, this exemplary data is summarized in Table 6 below.

TABLE 6

| Month | α: [AS, Type, Ctry., Hop] | β: [Raw, Quan.] | $\|\bullet\|_F$ |
|---|---|---|---|
| January | [0.0, 0.1, 0.1, 0.8] | [0.6, 0.4] | 0.3342 |
| February | [0.0, 0.1, 0.1, 0.8] | [0.5, 0.5] | 0.3345 |
| March | [0.0, 0.1, 0.1, 0.8] | [0.7, 0.3] | 0.3736 |
| April | [0.0, 0.1, 0.1, 0.8] | [0.6, 0.4] | 0.3725 |

TABLE 6-continued

| Month | α: [AS, Type, Ctry., Hop] | β: [Raw, Quan.] | $\|\bullet\|_F$ |
|---|---|---|---|
| May | [0.0, 0.1, 0.1, 0.8] | [0.7, 0.3] | 0.3959 |
| June | [0.0, 0.1, 0.1, 0.8] | [0.8, 0.2] | 0.4097 |
| July | [0.0, 0.1, 0.1, 0.8] | [0.9, 0.1] | 0.3962 |
| August | [0.0, 0.1, 0.1, 0.8] | [0.8, 0.2] | 0.3917 |
| September | [0.0, 0.1, 0.1, 0.8] | [0.6, 0.4] | 0.3618 |
| October | [0.0, 0.1, 0.1, 0.8] | [0.6, 0.4] | 0.3702 |

As will be appreciated by those of ordinary skill in the relevant art(s), several observations may be made from the data in Table 6. First, AS membership, AS type, and country affiliation similarity are minor compared to the strength of the distance similarity as an indicator. As a result, it appears that the first three spatial features are subsumed in the distance feature, or in other words, the distance information successfully encodes the other features such that it becomes a near-sufficient descriptor. This is likely to be true since topological distance naturally contains AS membership information, i.e., those prefixes in the same AS are considered most similar both in AS membership as well as in AS-distance. Similarly, these prefixes with the closest AS-distance will also bear the same AS type. Topologically close prefixes are also more likely to reside in the same country, so any geo-political and macro-economic information embedded in the country affiliation is also contained in the distance information. It is, therefore, not entirely unexpected that AS-distance should be a relevant factor in assessing similarity in maliciousness. However, because this factor is significant, embodiments include ignoring the other factors in predicting maliciousness.

Second, the $\beta_i$ weights suggest that the correlation between the latent variables and the observed data depend more on the raw aggregate signal rather than its quantized version. Table 6 also illustrates that the correlation relationship between the set of spatial features and network maliciousness remains stable from month to month.

Next, various embodiments include repeating the same inference analysis along different malicious activity types (i.e., by using $S^{sp}$, $S^{ph}$, $S^{sc}$, and their quantized versions, respectively), as the similarity matrices on the RHS of the inference model. For example, performing this analysis to the exemplary data shown in the month of October 2013 in Table 6 is shown in Table 7 below.

TABLE 7

| Maliciousness | α: [AS, Type, Ctry., Hop] | β: [Raw, Quan.] | $\|\bullet\|_F$ |
|---|---|---|---|
| Spam | [0.1, 0.1, 0.1, 0.7] | [0.1, 0.9] | 0.1913 |
| Phishing | [0.2, 0.1, 0.1, 0.6] | [0.2, 0.8] | 0.1930 |
| Scan | [0.2, 0.1, 0.1, 0.6] | [0.2, 0.8] | 0.1482 |

As previously discussed with reference to Table 6, the data in Table 7 similarly indicates that the AS-distance information remains a dominant indicator compared to the other spatial features. However, when inspecting each malicious activity type separately, the AS membership information takes on a more significant role in explaining the similarity in maliciousness. This is likely due to the fact that while prefixes within the same AS tend to have similar dynamics in their union aggregate signals, this is more so when the aggregate signals are derived from a single malicious activity type.

Interestingly, this coincides with the fact that in this case the quantized similarity plays a much more significant role than the raw similarity matrix (a much larger β weight, 0.80.9, compared to 0.1-0.2). This is a different observation from what's seen earlier when the inference is done over the complete union similarity matrix. As previously discussed, the quantized similarity captures most prominently synchronized behavior. As will be appreciated by those of ordinary skill in the relevant art(s), this result suggests that within each malicious activity type there is significant amount of synchronized or coordinated behavior, which gives rise to these high weights. The similarity in synchronization (or phase similarity) would correlate well with the distance information if the phase similarity corresponds to propagation of certain activities in space (see the illustration given in the discussion on the phishing similarity graph shown in FIG. 8B).

Third, the norm error is low when all four spatial features are included in the inference, suggesting a highly accurate linear model in explaining the observed data. This translates into very high predictive power of the model in predicting the similarity between malicious behaviors along each type.

Advantage of Multi-Layered Inference

Again, when there are potentially multiple latent variables at play, performing correlation jointly provides more consistent results with which to interpret the relative strengths of the correlation. Furthermore, jointly considering the set of latent variables is expected to lead to a better overall fit, or higher confidence in the inferencing result. Table 8 below shows the results of pairwise correlation performed by processor 114, using a least-square approach, by solving $\min_\alpha \|\alpha_i A_i - S\|_F$ between two matrices $A_i$ and $S$. The example shown in Table 8 is a result of using the union similarity matrices obtained from the month of October 2013. As shown in Table 8, these norm errors are much higher than those resulting from joint inference.

TABLE 8

| $|\cdot|_F$ | $S^U$ | $S^{q, U}$ |
|---|---|---|
| AS | 0.7442 | 0.7912 |
| Type | 0.7196 | 0.7653 |
| Ctry. | 0.6563 | 0.6754 |

Implication

As previously discussed, the similarity in maliciousness is most strongly correlated with topological distance. An interesting application of this result is its use in generating estimates of malicious activities in the absence of any information from various RBL data sources. As a result, as long as it is possible to establish certain fixed waypoints (or epicenters) whose malicious activity has been well established, it is then possible to use these results on similarity as a function of the AS hop distance to generate an estimate for any other prefix purely based on its topological distance from other waypoints.

Figure 12:
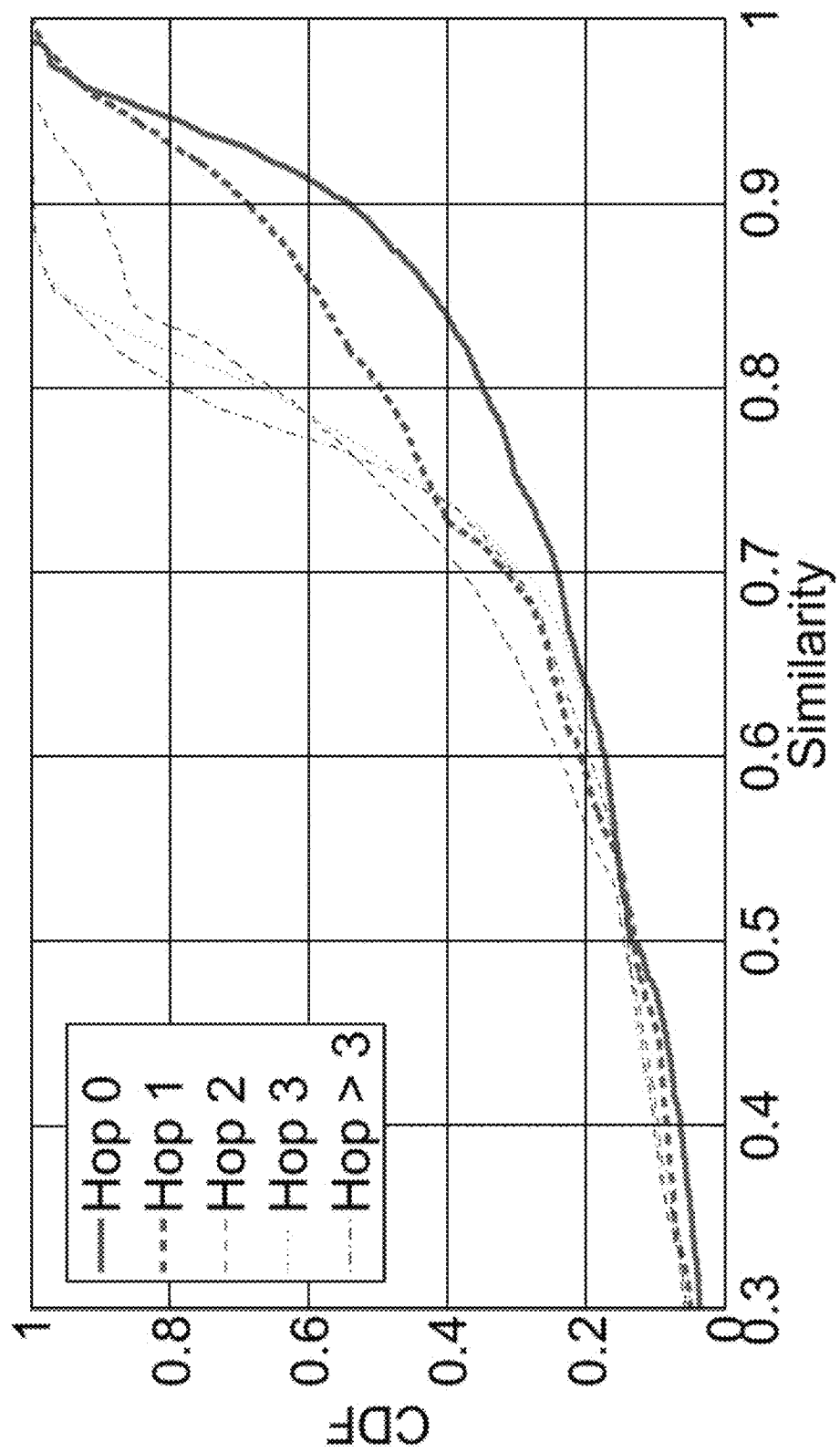
FIG. 12 illustrates an example graphical plot of the similarity distribution of different Autonomous System (AS) hops, in accordance with an embodiment.

FIG. 12 illustrates an example graphical plot of similarity distribution of different Autonomous System (AS) hops, in accordance with an embodiment. For example, the plot shown in FIG. 12 indicates how similarity measures are distributed for prefixes within n hops of each other, in accordance with an embodiment. As shown in FIG. 12, a clear difference is illustrated between ≤1 hop and >1 hops as the prefixes are much more similar to each other within 0 or 1 hop.

Predicting Network Maliciousness

In accordance with an embodiment, results obtained in the previous sections are utilized to determine better security policy design. For example, these results may be utilized to predict the maliciousness of a network. Two cases are examined. First, embodiments include determining how similarity may enhance the quality of temporal prediction of a given network when historical information about that network is available. Second, embodiments include using spatial features to accurately predict the maliciousness of a network without its historical information using only its spatial relationship with other networks and the latter's known historical information. These embodiments may be implemented, for example, via processor 114 executing instruction stored in similarity module 140.

Using Similarity to Enhance Temporal Prediction

In an embodiment, a temporal prediction may be made on a network's maliciousness using its historical information. In various embodiments, any number of suitable processes may be utilized to accomplish this. To provide an illustrative example, one method may include utilizing a model-based prediction method. More specifically each prefix's aggregate signal may be modeled in accordance with such an embodiment as a discrete-time Markov chain. The transition probability matrix of this Markov chain may be trained using past data $r_i(t)$ with a state space $R_i$ over a training window of size T as shown in Eqn. 2.3:

$$p^*_{x,y} = \frac{n_{x,y}(T)}{\sum_{w \in R_i} n_{x,w}(T)}, \forall\, x, y \in R_i \qquad \text{Eqn. 2.3}$$

where $p_{x,y}^*$ is the estimated probability of transition from state x to state y, and $n_{x,y}(T)$ is the number of transitions in the signal from x to y observed within this window. As will be appreciated by those of ordinary skill in the relevant art(a), this may be shown to be an optimal posterior estimate. Subsequently, embodiments include predicting the state of the signal at time t using conditional expectation, given its state at time t-1 using Eqn. 2.4:

$$\hat{r}_i^{temp}(t) = \Sigma_{w \in R_i} p_{r_i(t-1),w}^* \cdot w \qquad \text{Eqn. 2.4:}$$

This may be referred to as the temporal prediction. While the above is shown over one time step (i.e., day ahead in the aggregate signal), multi-step prediction may also be obtained using multi-step transition probabilities computed by processor 114 using $p_{x,y}^*$, though the prediction accuracy typically decays over longer periods.

In accordance with various embodiments, the above prediction may be further enhanced using the similarity measure. To illustrate this, first define the neighborhood of a prefix i as the set of prefixes j with which it has the highest similarity $S_{i,j}^*$, from historical/training data. Limiting the size of this neighborhood to K and denoting it as $N_i$. For purposes of brevity, the example used to demonstrate this concept is also limited to the un-quantized lists. However, embodiments include extending the application to both quantized and un-quantized lists. Defining a weight for each j∈$N_i$ as follows using σ as a smoothing parameter yields Eqn. 2.5 as follows:

$$\omega_j = \frac{e^{\frac{S_{i,j}^*}{\sigma^2}}}{\sum_{k \in N_i} e^{\frac{S_{i,k}^*}{\sigma^2}}} \qquad \text{Eqn. 2.5}$$

Then, a spatial prediction may be performed on prefix i using these neighbors, i.e., estimating i's aggregate signal value at time t using these neighbors' temporally predicted values at time t (obtained similarly using Eqn. 2.4) as shown below in Eqn. 2.6

$$\hat{r}_i^{spa}(t) = \Sigma_{j \in N_i} \omega_j \cdot \hat{r}_j^{temp}(t) \qquad \text{Eqn. 2.6:}$$

This is akin to spatial interpolation. That is, the process takes a weighted average of neighboring values to estimate an unknown value. To combine both spatial and temporal prediction to enhance the prediction result, an embodiment utilized an algorithm based on the following linear model as shown in Eqn. 2.7:

$$\hat{r}_i(t) = \lambda \cdot \hat{r}_i^{temp}(t) + (1-\lambda) \cdot \hat{r}_i^{spa}(t) \qquad \text{Eqn. 2.7:}$$

In an embodiment, Eqn. 2.8 shown below may be utilized by processor 114 as an optimization to determine the best choice of the factor $\lambda$:

$$\min_\lambda \sum_{i=1}^{N} (\hat{r}_i(t) - \hat{r}_i^*(t))^2 \qquad \text{Eqn. 2.8}$$

$$\text{s.t. } \lambda \in [0, 1].$$

The above optimization may be solved using training data. To better simplify the concept for illustrative purposes, the same $\lambda$ has been used for all prefixes. Embodiments also include performing an optimization to determine separate $\lambda$'s for different prefixes. The resulting optimal solution is given by Eqn. 2.9 below:

$$\lambda^* = \frac{\sum_{i=1}^{N}((\hat{r}_i^{spa}(t) - \hat{r}_i^{temp}(t))(\hat{r}_i^*(t) - \hat{r}_i^{temp}(t))}{\sum_{i=1}^{N}(\hat{r}_i(t) - \hat{r}_i^*(t))^2}, \qquad \text{Eqn. 2.9}$$

if it is within [0, 1], and otherwise cut off at 0 (if $\lambda^*<0$) or 1 (if $\lambda^*>1$). In an embodiment, the prediction performance may be given by Eqn. 3.0, which represents an error function:

$$e_i = |\hat{r}_i(t) - \hat{r}_i^*(t)|. \qquad \text{Eqn. 3.0:}$$

Figure 13:
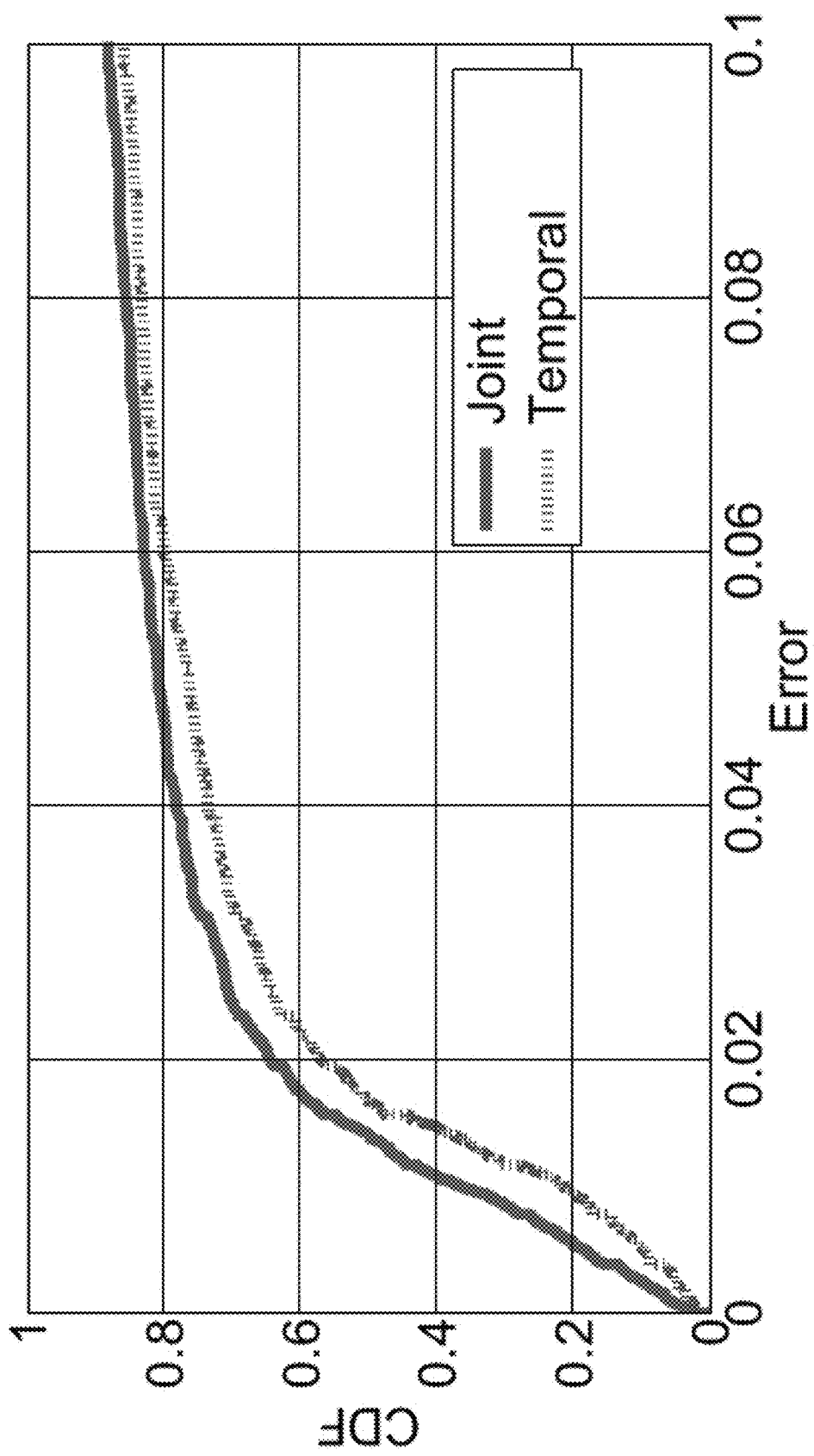
FIG. 13 illustrates an example graphical plot of a prediction performance comparison, in accordance with an embodiment.

FIG. 13 illustrates an example graphical plot of a prediction performance comparison, in accordance with an embodiment. That is, FIG. 13 shows a comparison between using only temporal prediction by application of Eqn. 2.4, versus the joint prediction by application of Eqn. 2.7, both using a time period of one day-ahead prediction as an example. FIG. 13 shows this for all prefixes as a CDF over the prediction error. As shown in FIG. 13, am improvement may be observed by using this similarity information. For example, the number of predictions may be increased at <1% accuracy by 100% (doubling the number of prefixes predicted at this accuracy level).

Prediction of Unknown Prefixes

In accordance with an embodiment, network maliciousness may be determined in a scenario where no information is known regarding a prefix's maliciousness, but only its spatial relationship with some other prefixes whose aggregated signals are known. In such a case, there is not enough information to compute similarity between this prefix and the others; thus we shall make use the set of spatial features and their strengths in predicting similarity as previously discussed.

Specifically, a prefix i's neighborhood $N_i$ may be redefined as the set of prefixes within one hop, i.e., $\forall j$ such that $h(i,j) \leq 1$. In an embodiment, these one-hop neighbors may be utilized for prediction on i. The choice of 1-hop neighbors may be based on data used to generate the relationships illustrated in FIG. 12, which shows a clear drop in similarity beyond hop 2. Next, a spatial similarity matrix A may be defined as follows using the inference results obtained in the previous discussion with regards to a multiplayer inference model:

$$A = 0 \cdot A_1 + 0.1 \cdot A_2 + 0.8 \cdot A + 0.1 \cdot A_4 \qquad \text{Eqn. 3.1:}$$

And similarly a weight $\omega_j$ may be calculated for each $j \in N$ using Eqn. 2.5 but by replacing $S_{i,j}^*$ with $A_{i,j}$. This yields a prediction for an unknown prefix i given by Eqn. 3.2:

$$\Sigma_{j \in N_i} \omega_j \cdot r_j^*(t) \qquad \text{Eqn. 3.2:}$$

Figure 14:
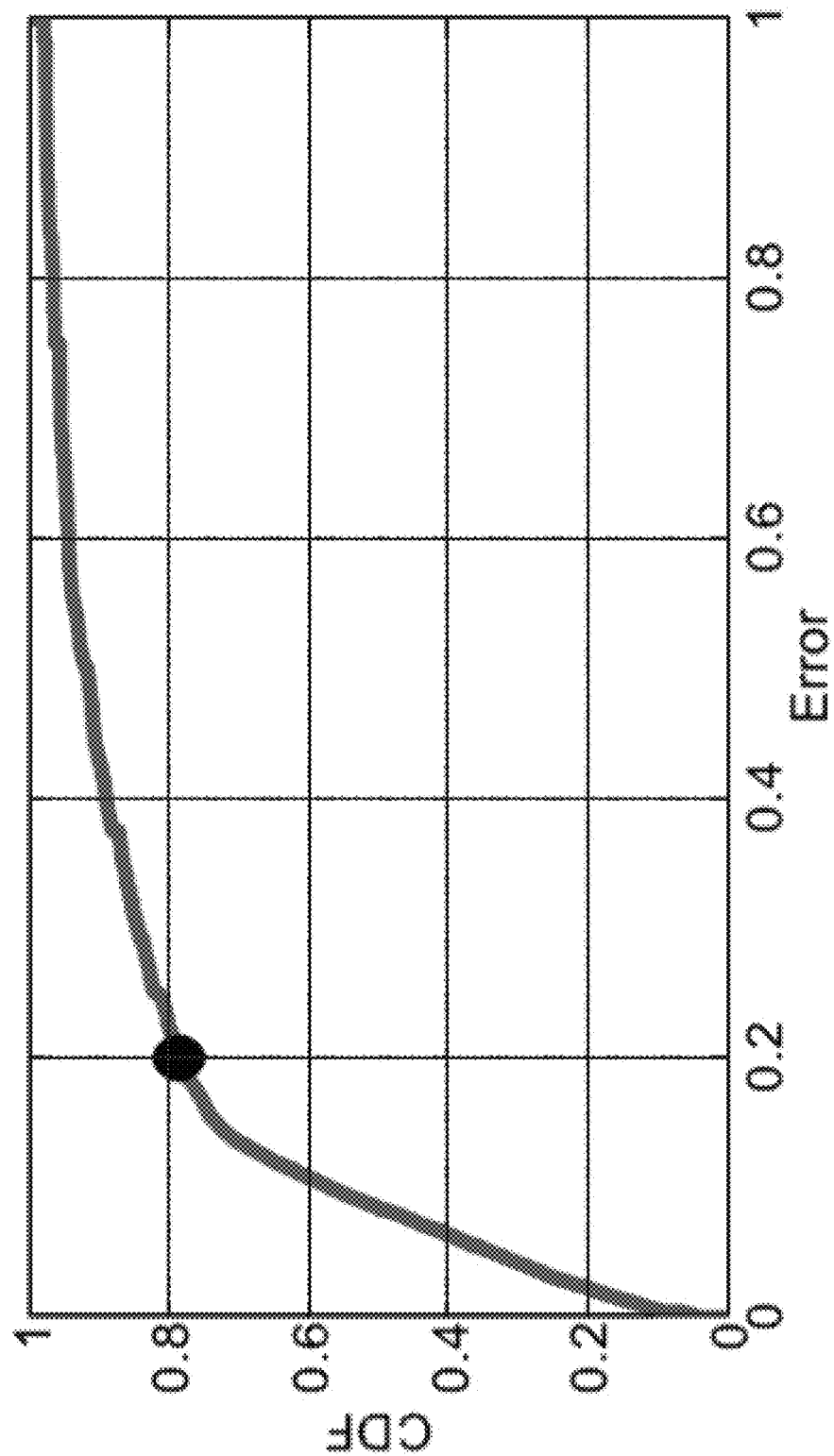
FIG. 14 illustrates an example graphical plot of a Cumulative Distribution Function (CDF) of prediction errors, in accordance with an embodiment.

FIG. 14 illustrates an example graphical plot of a Cumulative Distribution Function (CDF) of prediction errors, in accordance with an embodiment. That is, the prediction results for the example aggregated signals using this process are shown in FIG. 14. As shown in FIG. 14, about half of the networks have less than 10% prediction error while around 80% of all prefixes have less than 20% prediction error (as indicated in the figure). For brevity, the result shown here is for a randomly selected date t, although the overall observation holds in general.

In an embodiment, same type of prediction may be performed along each of the malicious types by considering different types of aggregate signals. For each type of maliciousness, the similarity matrix A may be calculated using the inference result corresponding to that type as shown in Table 7.

Figure 15:
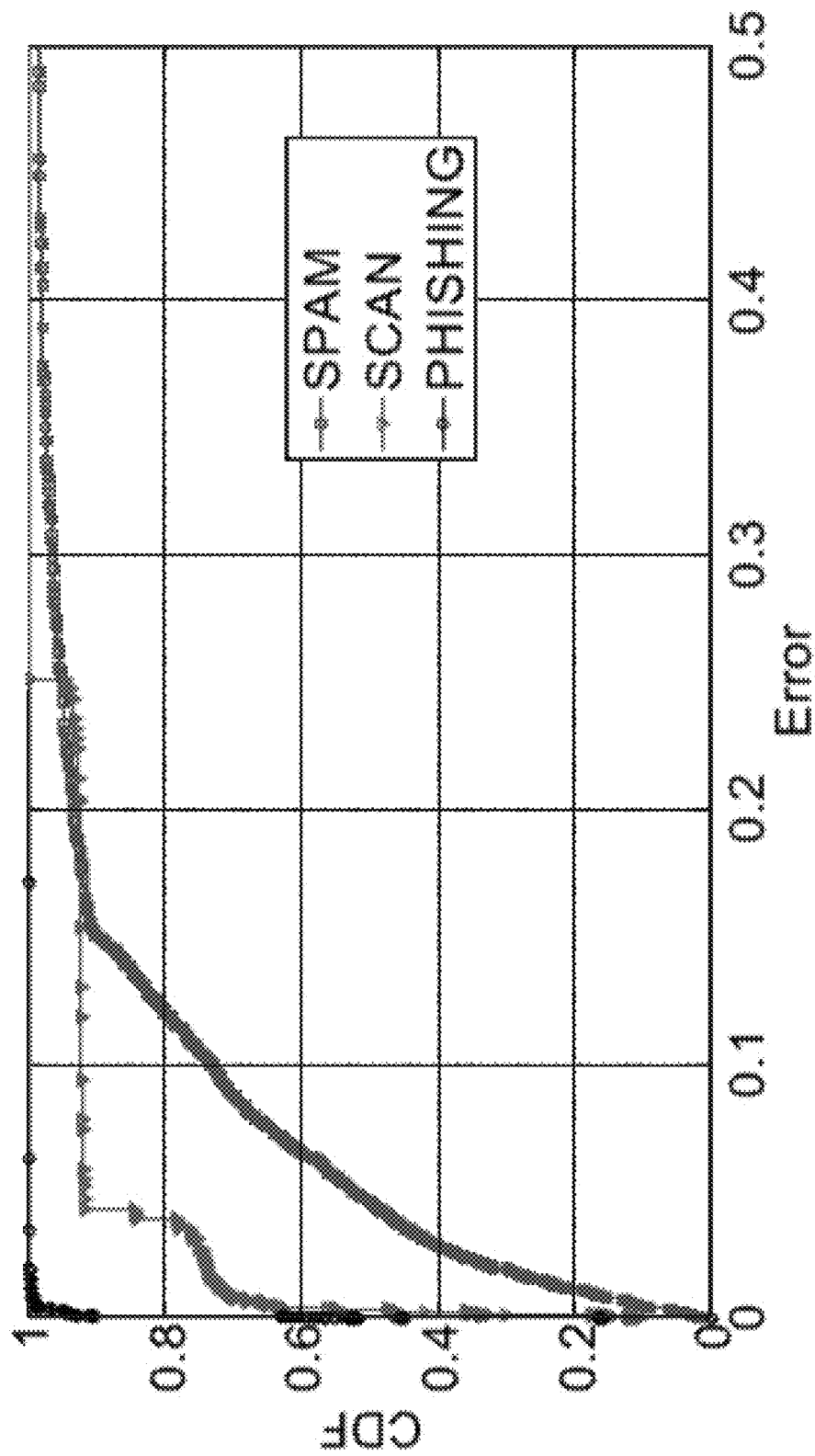
FIG. 15 illustrates an example graphical plot of a CDF of prediction errors for different types of network maliciousness, in accordance with an embodiment.

FIG. 15 illustrates an example graphical plot of a CDF of prediction errors for different types of network maliciousness, in accordance with an embodiment. This set of prediction results are shown in FIG. 15. The improvement shown in FIG. 15 is a result of the inference results being more accurate when the individual types are considered.

Various concepts are discussed throughout the disclosure related to the application of mathematical equations and constructs. Where applicable, a relevant reference has been made to reference a processor, such as processor 114, for example, carrying out the computations associated with the equations as one or more algorithms. As will be appreciated by those of ordinary skill in the relevant art(s), not every instance of processes described by the equations may be defined throughout the disclosure as being carried out by a processor. However, embodiments include any suitable equation and the mathematical representation thereof being carried out by a processor or any other suitable manner to facilitate the relevant applications associated therewith.

Additionally, certain embodiments are described herein as including logic or a number of routines, subroutines, applications, instructions, algorithms, etc. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s).

Appendix

In this appendix we show the conditions under which the linear estimation model used in the disclosure are justified. We start by introducing an underlying factor selection/controller random variable Z that determines the generation of H from $\{A_i\}$ by acting as a random switch, and consider this simplified model. As will be appreciated by those of ordinary skill in the relevant art(S), this method may typically be employed in Bayesian inference.

Figure 16:
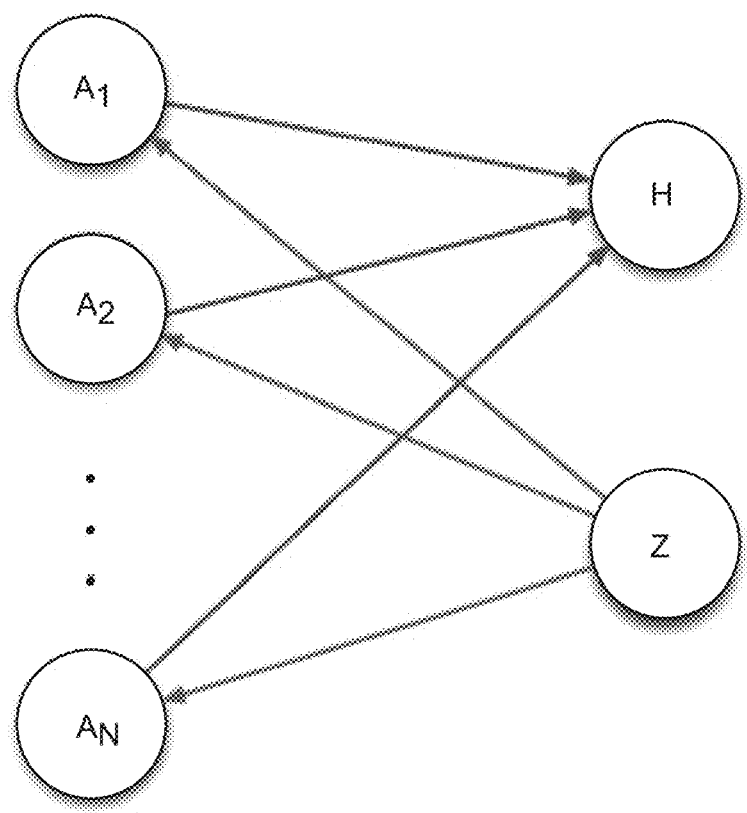
FIG. 16 illustrates an example graphical model illustrating the Left Hand Side (LHS) problem, in accordance with an embodiment.

Again, the LHS problem may be explained as the inference of H using the latent variable matrices $\{A_i\} \rightarrow H$. FIG. 16 illustrates an example graphical model illustrating the Left Hand Side (LHS) problem, in accordance with an embodiment. The model shown in FIG. 16 typically comes with the conditional independence assumption given by Eqn. A1:

$$P(H \mid A_1, A_2, A_3) = \sum_{Z=z} P(H, Z = z \mid A_1, A_2, A_3) \quad \text{Eqn. A1}$$
$$= \sum_{Z=z} \eta_z \cdot P_z(H \mid A_1, A_2, A_3, Z = z).$$

where $\eta_z = P(Z = z \mid A_1, A_2, A_3)$. Based on our assumption on conditional independence, we have Eqn. A2:

$$P_z(H \mid A_1, A_2, A_3, Z = z) = \frac{P(H, A_1, A_2, A_3, Z = z)}{\sum_{\tilde{H}} P(\tilde{H}, A_1, A_2, A_3, Z = z)} \quad \text{Eqn. A}$$
$$= \frac{P(H)P_z(A_z \mid H)\Pi_{Z \neq z}P_z(A_z)}{\sum_{\tilde{S}} P(\tilde{H})P_z(A_z \mid \tilde{H})\Pi_{Z \neq z}P_z(A_z)}$$
$$= \frac{P(H)P_z(A_z \mid H)}{P_z(A_z)}$$

Let $\gamma_z = \frac{\eta_z}{P_z(A_z)}$. Then:

$$P(H \mid A_1, A_2, A_3) = \sum \gamma_z P(H) P_z(A_z \mid H). \quad \text{Eqn. A}$$

Assuming that the prior on H is uniform, the maximum a-posteriori probability (MAP) estimation rule reduces to:

$$\text{argmax}_H \Sigma \gamma_z P_z(A_z \mid H), \quad \text{Eqn. A4:}$$

which is also the same as the maximum likelihood problem. Similarly, we can reduce the inference problem for the RHS to:

$$\text{argmax}_H \Sigma K_z P_z(S_z \mid H), \quad \text{Eqn. A5:}$$

with a possibly different number of states z. In general, solving these problems is difficult without assuming the conditional distributions of the observations A's and S's. However, we can make the analysis more tractable by assuming that A's and S's follow an isometric Gaussian distribution, i.e., $$P_z(A_z \mid H) = N(H, \sigma_z^2 I), \quad \text{Eqn. A6:}$$

$$P_z(S_z \mid H) = N(H, \sigma_z^2 I). \quad \text{Eqn. A7:}$$

Denoting the objective function in the MAP problem of Eqn. A5 as f(x). An arbitrary $x \in R^n$ may be taken, and x projected onto the following sphere:

$$S_\lambda = A_1 + \lambda_2(A_2 - A_1) + \lambda_3(A_3 - A_1). \quad \text{Eqn. A8:}$$

Denote x* as the projection of x onto $S_\lambda$, and let $\tilde{x}$ be the orthogonal component. By plugging in the multivariate Gaussian distribution in Eqn. A4, each term i appears in an argument of an exponential function. To solve the MAP problem, these terms need to minimized. Consider the term associated with $A_1$. We have:

$$(\tilde{x}+x^*-A_1)^T(\tilde{x}+x^*-A_1)=(x^*-A_1)T(x^*-A_1)+2\tilde{x}(x^*-A_1)+\tilde{x}^T\tilde{x}. \quad \text{Eqn. A9:}$$

Notice that due to orthogonality $\tilde{x}(x^*-A1)=0$, and therefore:

$$(\tilde{x}+x^*-A_1)^T(\tilde{x}+x^*-A_1) \geq (x^*-A_1)^T(x^*-A_1). \quad \text{Eqn. A10:}$$

The two remaining terms may be similarly analyzed. We conclude that $f(x^*) \geq f(x)$. It is also easy to show (via geometry of induction) that the optimum must be between $A_1, A_2, A_3$, i.e., $\lambda_2, \lambda_3 \in [0,1]$, as $f(f(\cdot))$ decreases when the distance between x and $A_1, A_2, A_3$ increases. Thus, the initial assumption has been proven.

What is claimed:

1. A method for rating malicious network activity, the method comprising:
    aggregating, by one or more hardware processors, sets of internet protocol (IP) addresses from monitored network traffic over a sampling period;
    measuring, by the one or more hardware processors, a number of malicious IP addresses within each of the aggregated sets of IP addresses over a plurality of time intervals within the sampling period, the malicious IP addresses being known prior to the aggregation of the sets of IP addresses based upon their inclusion within a reference list;
    generating, by the one or more hardware processors, a plurality of aggregate signals, each aggregate signal from among the plurality of aggregate signals being associated with a respective time interval from among the plurality of time intervals and having a magnitude based on the number of malicious IP addresses within each respective time interval,
    wherein a higher number of malicious IP addresses is associated with a higher magnitude, and
    wherein the malicious IP addresses are associated with one or more categories of malicious network behavior,
    categorizing, by the one or more hardware processors, each respective one of the plurality of aggregate signals that is associated with each respective time interval into one of a good, normal, or bad malicious region relative to an average magnitude of the plurality of aggregate signals over the duration of the sampling period,
    wherein categorizing each respective one of the plurality of aggregate signals comprises categorizing each respective one of the plurality of aggregate signals into one of a good, normal, or bad malicious region by determining the average magnitude of the plurality of aggregate signals by evaluating the equation:

$$r_{ave} = \frac{\sum_{t=1}^{T} r(t)}{T},$$

wherein: $r_{ave}$ represents the average magnitude of the plurality of aggregate signals over the duration of the sampling period, r(t) represents each respective one of the plurality of aggregate signals as a function of time during the sampling period, and T represents the sampling period, wherein the good, normal, and bad regions define quantized regions based upon whether each respective one of the plurality of aggregate signals has a magnitude that is less than a good region threshold, greater than the good region threshold and less than a bad region threshold, or exceeds the bad region threshold, respectively;

assigning, by the one or more hardware processors, for each respective one of the plurality of aggregate signals that has been categorized into one of the good, normal, or bad malicious regions, one or more of an intensity, duration, and frequency feature to provide a feature set for each respective one of the plurality of aggregate signals;

performing spectral analysis, by the one or more hardware processors, on each of the intensity, duration, and frequency feature set, respectively, for each respective one of the plurality of aggregate signals; and generating, by the one or more hardware processors, a plurality of maliciousness profiles based on the spectral analysis such that each of the respective intensity, duration, and frequency feature sets share dominant eigenvalues.

2. The method of claim 1, wherein each of the plurality of maliciousness profiles includes a quantized value associated with the good, normal, and bad malicious regions, respectively, for each of the intensity, duration, and frequency feature, and further comprising:

selecting, by the one or more hardware processors, one of the intensity, duration, and frequency features to analyze each respective one of the plurality of aggregate signals for maliciousness;

assigning, by the one or more hardware processors, weights to each of the intensity, duration, and frequency features, respectively, for each of the plurality of maliciousness profiles such that heaviest weight is associated with the selected one of the intensity, duration, and frequency features; and determining, by the one or more hardware processors, a plurality of maliciousness scores for each of the plurality of maliciousness profiles, respectively, based on a weighted combination of each of the intensity, duration, and frequency features.

3. The method of claim 2, wherein:

the plurality of maliciousness scores are distributed between a minimum maliciousness score and a maximum maliciousness score;

the minimum maliciousness score is representative of a minimum amount of maliciousness based on the selected one of the intensity, duration, and frequency feature; and the maximum maliciousness score is representative of a maximum amount of maliciousness based on the selected one of the intensity, duration, and frequency feature.

4. The method of claim 1, wherein the act of aggregating sets of IP addresses comprises one or more of:

aggregating sets of IP addresses according to network prefixes;

aggregating sets of IP addresses according to autonomous systems (ASes); and aggregating sets of IP addresses according to organizational boundaries.

5. The method of claim 1, wherein the categories of malicious network behavior include one or more of:

spam attacks;

phishing attacks;

malware attacks; and active attacks.

6. The method of claim 1, wherein:

the intensity feature is based on an average magnitude of each respective one of the plurality of aggregate signals over the sampling period;

the duration feature is based on an average amount of time each respective one of the plurality of aggregate signals remained at the good, bad, or normal malicious region over the sampling period; and the frequency feature is based on a number of times each respective one of the plurality of aggregate signals enter the good, bad, or normal malicious region over the sampling period.

7. The method of claim 1, wherein the reference list includes an IP-address reputation blacklist or on a malicious activity incident report list, and wherein the act of measuring the number of malicious IP addresses comprises:

measuring the number of malicious IP addresses by determining IP addresses, within each of the aggregated sets of IP addresses over the sampling period, that are identified on the IP-address reputation blacklist or on the malicious activity incident report list.

8. The method of claim 1, further comprising:

routing, by the one or more hardware processors, IP addresses associated with sets of aggregated IP addresses having a first malicious profile from among the plurality of maliciousness profiles to a first router; and routing, by the one or more hardware processors, IP addresses associated with sets of aggregated IP addresses having a second malicious profile from among the plurality of maliciousness profiles to a second router, wherein the first malicious profile is indicative of a higher maliciousness than the second malicious profile, and wherein the first router provides a lower quality of service (QoS) than the second router.

9. The method of claim 1, further comprising:

routing, by the one or more hardware processors, IP addresses associated with sets of aggregated IP addresses having a first malicious profile from among the plurality of maliciousness profiles to a first network; and routing, by the one or more hardware processors, IP addresses associated with sets of aggregated IP addresses having a second malicious profile from among the plurality of maliciousness profiles to a second network, wherein the first malicious profile is indicative of a higher maliciousness than the second malicious profile, and wherein the first network operates at a lower cost than the second network.

10. The method of claim 1, further comprising:
routing, by one or more hardware processors, IP addresses in accordance with a best path selection (BGP) procedure such that the IP addresses are preferentially routed to sets of aggregated IP addresses having a first malicious profile from among the plurality of maliciousness profiles while avoiding routing of the IP addresses to sets of aggregated IP addresses having a second malicious profile from among the plurality of maliciousness profiles, and
wherein the second malicious profile is indicative of a higher maliciousness than the first malicious profile.

11. The method of claim 1, further comprising:
performing, by the one or more hardware processors, deep packet inspection (DPI) on IP addresses associated with sets of aggregated IP addresses having a first malicious profile from among the plurality of maliciousness profiles; and
not performing DPI on IP addresses associated with sets of aggregated IP addresses having a second malicious profile from among the plurality of maliciousness profiles,
wherein the first malicious network profile is indicative of a higher maliciousness than the second malicious network profile.

12. A network analyzer for rating malicious network activity, the network analyzer comprising:
a network interface configured to monitor network traffic; and
a hardware processor configured to:
aggregate sets of internet protocol (IP) addresses within the monitored network traffic over a sampling period;
measure a number of malicious IP addresses within each of the aggregated sets of IP addresses at a plurality of time intervals within the sampling period, the malicious IP addresses being known prior to the aggregation of the sets of IP addresses based upon their inclusion within a reference list;
generate a plurality of aggregate signals, each aggregate signal from among the plurality of aggregate signals being associated with a respective time interval from among the plurality of time intervals and having a magnitude based on the number of malicious IP addresses within each respective time interval,
wherein a higher number of malicious IP addresses is associated with a higher magnitude, and
wherein the malicious IP addresses are associated with one or more categories of malicious network behavior,
categorize each respective one of the plurality of aggregate signals that is associated with each respective time interval into one of a good, normal, or bad malicious region relative to an average magnitude of the plurality of aggregate signals over the duration of the sampling period, wherein the hardware processor is further configured to categorize each of the plurality of aggregate signals by categorizing each respective one of the plurality of aggregate signals into one of a good, normal, or bad malicious region by determining the average magnitude of the plurality of aggregate signals by evaluating the equation:

$$r_{ave} = \frac{\sum_{t=1}^{T} r(t)}{T},$$

wherein: $r_{ave}$ represents the average magnitude of the plurality of aggregate signals over the duration of the sampling period, $r(t)$ represents each respective one of the plurality of aggregate signals as a function of time during the sampling period, and T represents the sampling period,
wherein the good, normal, and bad regions define quantized regions based upon whether each respective one of the plurality of aggregate signals has a magnitude that is less than a good region threshold, greater than the good region threshold and less than a bad region threshold, or exceeds the bad region threshold, respectively;
generate a feature set for each respective one of the plurality of aggregate signals by assigning, for each of the good, normal, and bad malicious regions, one or more of an intensity, duration, and frequency feature;
perform a spectral analysis on each of the respective intensity, duration, and frequency feature set from each respective one of the plurality of aggregate signals; and
generate a plurality of maliciousness profiles based on the spectral analysis such that each of the respective intensity, duration, and frequency feature set shares dominant eigenvalues.

13. The network analyzer of claim 12, wherein the hardware processor is further configured to:
train a classifier by combining the feature set for each respective one of the plurality of aggregate signals with information regarding whether a network associated with the network traffic has suffered from a data breach as identified by the plurality of maliciousness profiles; and
utilize the classifier to predict a likelihood that the network will suffer from a future data breach.

14. The network analyzer of claim 12, wherein each of the plurality of maliciousness profiles includes a quantized value associated with the good, normal, and bad malicious regions, respectively, for each of the intensity, duration, and frequency feature, and wherein the hardware processor is further configured to:
select one of the intensity, duration, and frequency features to analyze each respective one of the plurality of aggregate signals for maliciousness;
assign weights to each of the intensity, duration, and frequency features, respectively, for each of the plurality of maliciousness profiles such that heaviest weight is associated with the selected one of the intensity, duration, and frequency features; and
determine a plurality of maliciousness scores for each of the plurality of maliciousness profiles, respectively, based on a weighted combination of each of the intensity, duration, and frequency features.

15. The network analyzer of claim 14, wherein:
the plurality of maliciousness scores are distributed between a minimum maliciousness score and a maximum maliciousness score;
the minimum maliciousness score is representative of a minimum amount of maliciousness based on the selected one of the intensity, duration, and frequency feature; and
the maximum maliciousness score is representative of a maximum amount of maliciousness based on the selected one of the intensity, duration, and frequency feature.

16. The network analyzer of claim 12, wherein:
the intensity feature is based on an average magnitude of each respective one of the plurality of aggregate signals over the sampling period;
the duration feature is based on an average amount of time each respective one of the plurality of aggregate signals remained at the good, bad, or normal malicious region over the sampling period; and
the frequency feature is based on a number of times each respective one of the plurality of aggregate signals enter the good, bad, or normal malicious region over the sampling period.

17. The network analyzer of claim 12, wherein the reference list includes an IP-address reputation blacklist or on a malicious activity incident report list, and
wherein the hardware processor is further configured to measure the number of malicious IP addresses by determining IP addresses, within each of the aggregated sets of IP addresses over the sampling period, that are identified on the IP-address reputation blacklist or on the malicious activity incident report list.

18. The network analyzer of claim 12, wherein the hardware processor is further configured to route IP addresses associated with sets of aggregated IP addresses having a first malicious profile from among the plurality of maliciousness profiles to a first router, and to route IP addresses associated with sets of aggregated IP addresses having a second malicious profile from among the plurality of maliciousness profiles to a second router,
wherein the first malicious profile is indicative of a higher maliciousness than the second malicious profile, and
wherein the first router provides a lower quality of service (QoS) than the second router.

19. The network analyzer of claim 12, wherein the hardware processor is further configured to route IP addresses associated with sets of aggregated IP addresses having a first malicious profile from among the plurality of maliciousness profiles to a first network, and to route IP addresses associated with sets of aggregated IP addresses having a second malicious profile from among the plurality of maliciousness profiles to a second network,
wherein the first malicious profile is indicative of a higher maliciousness than the second malicious profile, and
wherein the first network operates at a lower cost than the second network.

20. The network analyzer of claim 12, wherein the hardware processor is further configured to route IP addresses in accordance with a best path selection (BGP) procedure such that the IP addresses are preferentially routed to sets of aggregated IP addresses having a first malicious profile from among the plurality of maliciousness profiles while avoiding routing of the IP addresses to sets of aggregated IP addresses having a second malicious profile from among the plurality of maliciousness profiles, and
wherein the second malicious profile is indicative of a higher maliciousness than the first malicious profile.

21. The network analyzer of claim 12, wherein the hardware processor is further configured to perform deep packet inspection (DPI) on IP addresses associated with sets of aggregated IP addresses having a first malicious profile from among the plurality of maliciousness profiles, and to not perform DPI on IP addresses associated with sets of aggregated IP addresses having a second malicious profile from among the plurality of maliciousness profiles,
wherein the first malicious network profile is indicative of a higher maliciousness than the second malicious network profile.

* * * * *